US007363581B2

(12) United States Patent
Parks et al.

(10) Patent No.: US 7,363,581 B2
(45) Date of Patent: Apr. 22, 2008

(54) PRESENTATION GENERATOR

(75) Inventors: Michael T. Parks, Norwood, MA (US); Steven B. Petchon, Malvern, PA (US)

(73) Assignee: Accenture Global Services GmbH, Schaffhausen (CH)

( * ) Notice: Subject to any disclaimer, the term of this patent is extended or adjusted under 35 U.S.C. 154(b) by 346 days.

(21) Appl. No.: 10/915,082

(22) Filed: Aug. 10, 2004

(65) Prior Publication Data

US 2005/0039119 A1 Feb. 17, 2005

Related U.S. Application Data

(60) Provisional application No. 60/494,606, filed on Aug. 12, 2003.

(51) Int. Cl.
*G06F 17/00* (2006.01)
*G06F 17/30* (2006.01)

(52) U.S. Cl. .................. 715/513; 715/514; 715/522; 715/523; 707/1; 707/4

(58) Field of Classification Search ............. 715/513, 715/514, 522, 523; 707/1, 100, 101, 102, 707/4
See application file for complete search history.

(56) References Cited

U.S. PATENT DOCUMENTS

| | | | | |
|---|---|---|---|---|
| 5,963,938 A | * | 10/1999 | Wilson et al. ............... | 707/4 |
| 6,601,071 B1 | * | 7/2003 | Bowker et al. ............ | 707/102 |
| 6,684,204 B1 | * | 1/2004 | Lal ............................. | 707/3 |
| 6,694,321 B1 | * | 2/2004 | Berno ........................ | 707/101 |
| 6,725,426 B1 | * | 4/2004 | Pavlov ....................... | 715/523 |
| 6,766,330 B1 | * | 7/2004 | Chen et al. ................ | 707/102 |
| 6,785,673 B1 | * | 8/2004 | Fernandez et al. .......... | 707/3 |
| 6,925,631 B2 | * | 8/2005 | Golden ...................... | 717/115 |
| 6,934,712 B2 | * | 8/2005 | Kiernan et al. ............ | 707/102 |

(Continued)

FOREIGN PATENT DOCUMENTS

WO WO 03/075191 A1 9/2003

OTHER PUBLICATIONS

"Windward Reports Press Release"[Online] Jan. 2, 2003, XP002332282 Retrieved from the Internet: URL:http://www.windwardreports.com/pr_wr_0 1.htm> [retrieved on Jun. 16, 2005].

*Primary Examiner*—Doug Hutton
*Assistant Examiner*—Chau Nguyen
(74) *Attorney, Agent, or Firm*—Oppenheimer Wolff & Donnelly LLP

(57) ABSTRACT

A presentation generator may access one or more data sources structured into data fields. The user may create or modify a template by inserting one or more tags corresponding to data fields in the template. The template may also have one or more processing instructions for indicating the data sources and how the data sources should be queried. The processing instructions may also indicate how the data is to be grouped across various slides, pages, sections, etc. The generator may build the presentation based on the template, its tags, and its processing instructions. The resulting presentation may be accessed by a user-friendly application, such as a word processor, slide program, spreadsheet, report viewer, or other application. The user may update part or all of the presentation using information on the queries and data sources embedded in the presentation itself.

10 Claims, 38 Drawing Sheets

U.S. PATENT DOCUMENTS

| | | |
|---|---|---|
| 2001/0018697 A1 | 8/2001 | Kunitake et al. |
| 2002/0178394 A1* | 11/2002 | Bamberger et al. ............ 714/1 |
| 2003/0101416 A1 | 5/2003 | McInnes et al. |
| 2003/0144982 A1* | 7/2003 | Reulein et al. ................ 707/1 |
| 2004/0199524 A1* | 10/2004 | Rys et al. ................... 707/100 |
| 2006/0041839 A1* | 2/2006 | Kassan ....................... 715/513 |

* cited by examiner

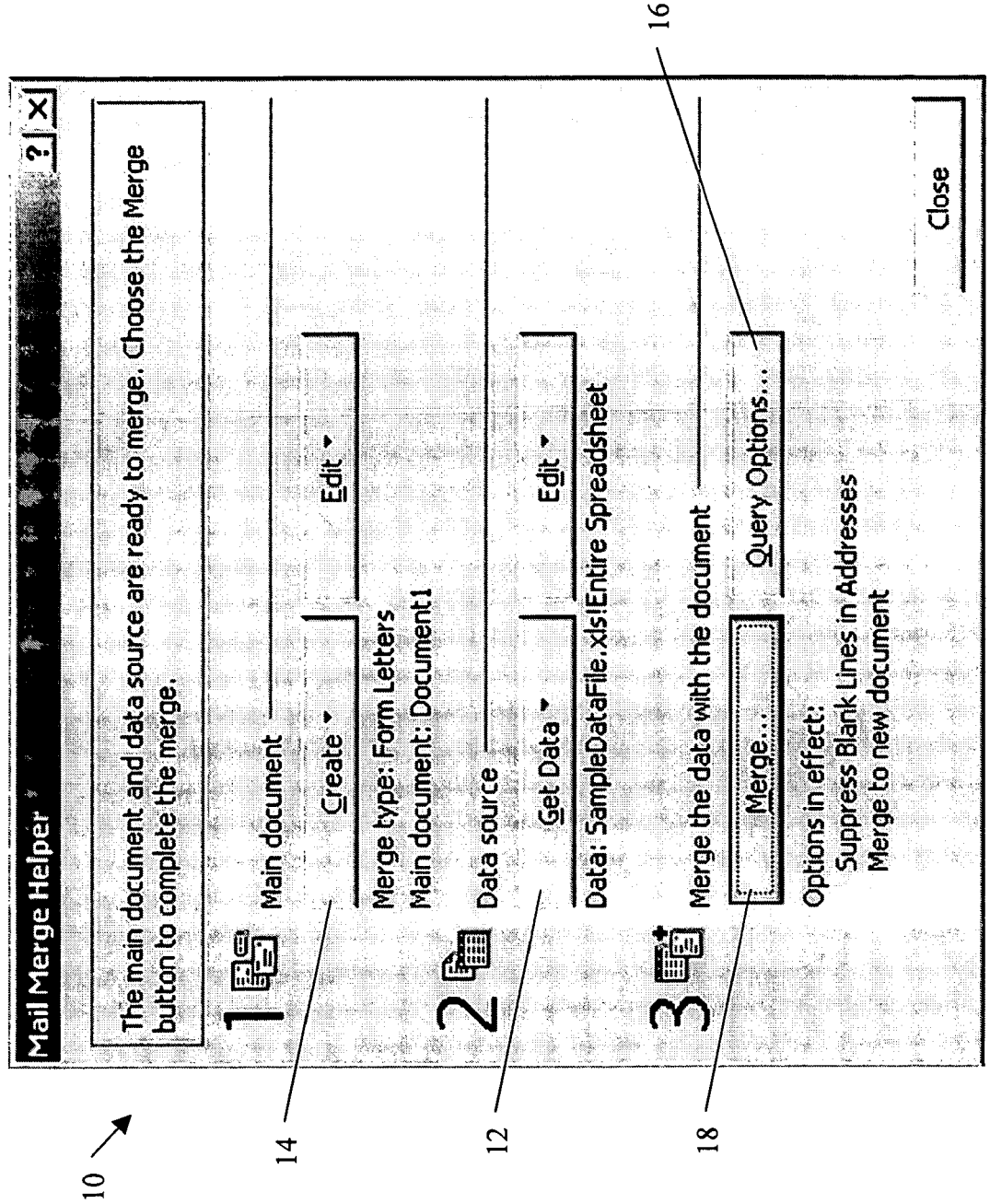
FIGURE 1 – Prior Art

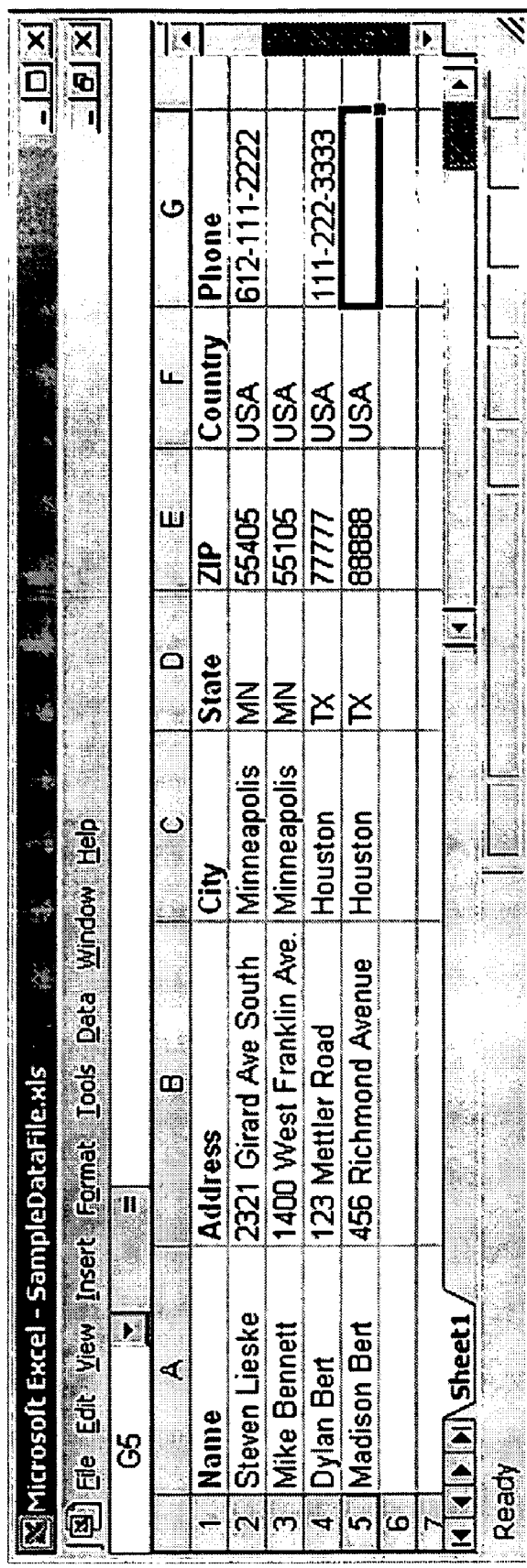
Excel Data File
FIGURE 2 – Prior Art

«Name» ——— 32
«Address»
«City», «State» «ZIP»

We are updating our computer records. { IF «phone» <> "" "Our records indicate your phone number is «phone»." "We do not have your phone number on file." }
                              34

Sincerely,

ABC Corporation

Template Letter

FIGURE 3 – Prior Art

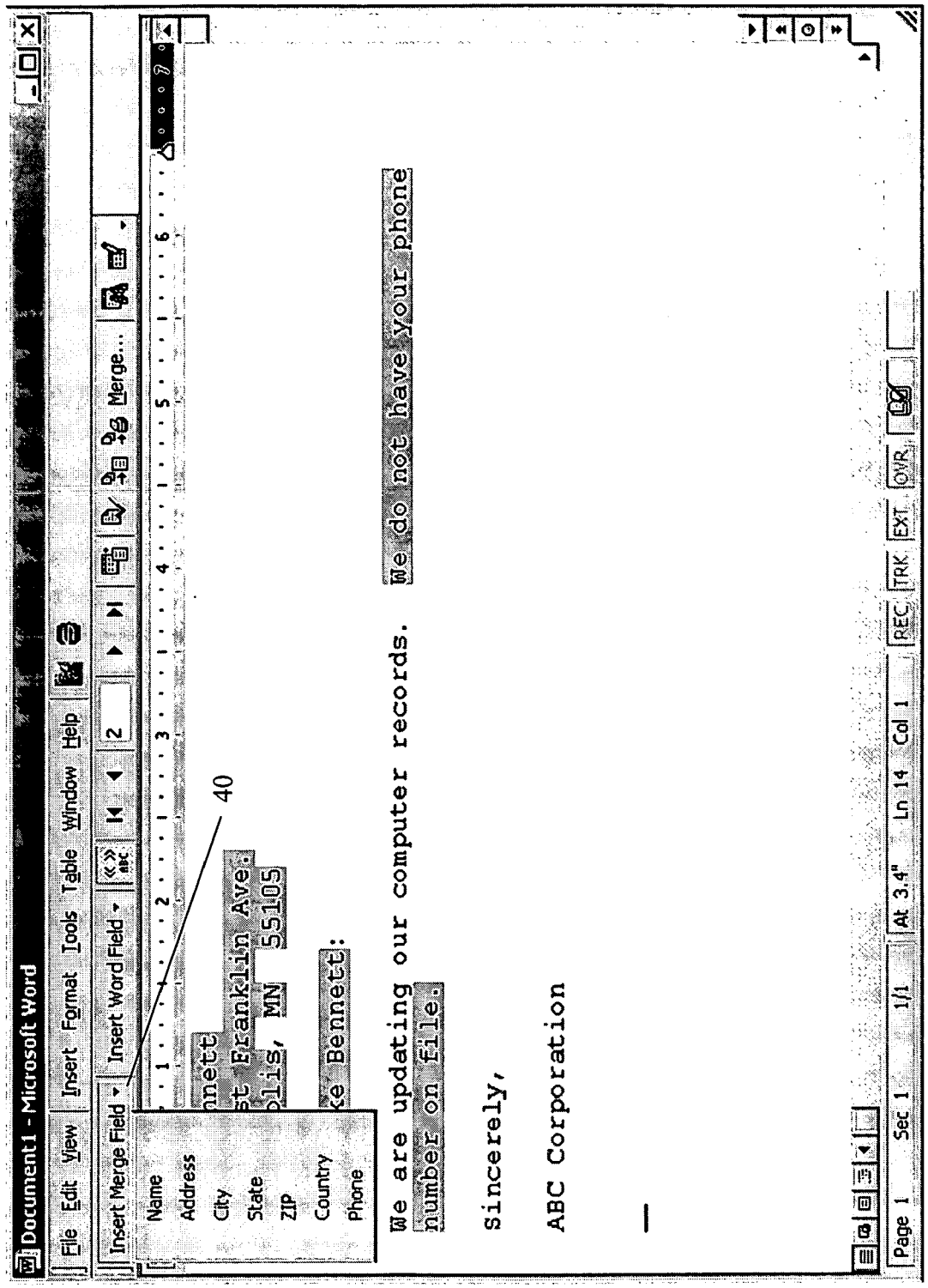
FIGURE 4 – Prior Art

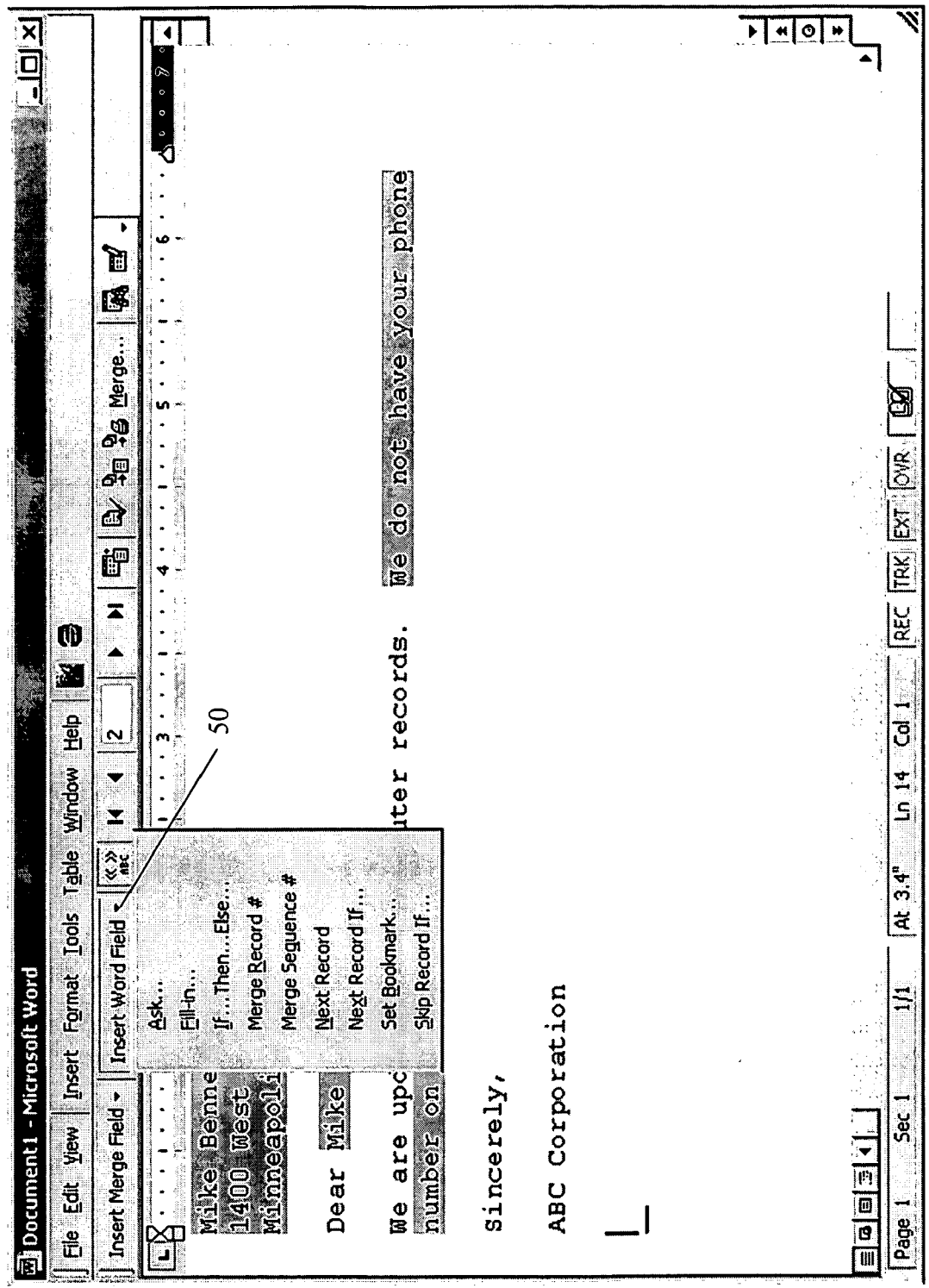
FIGURE 5 – Prior Art

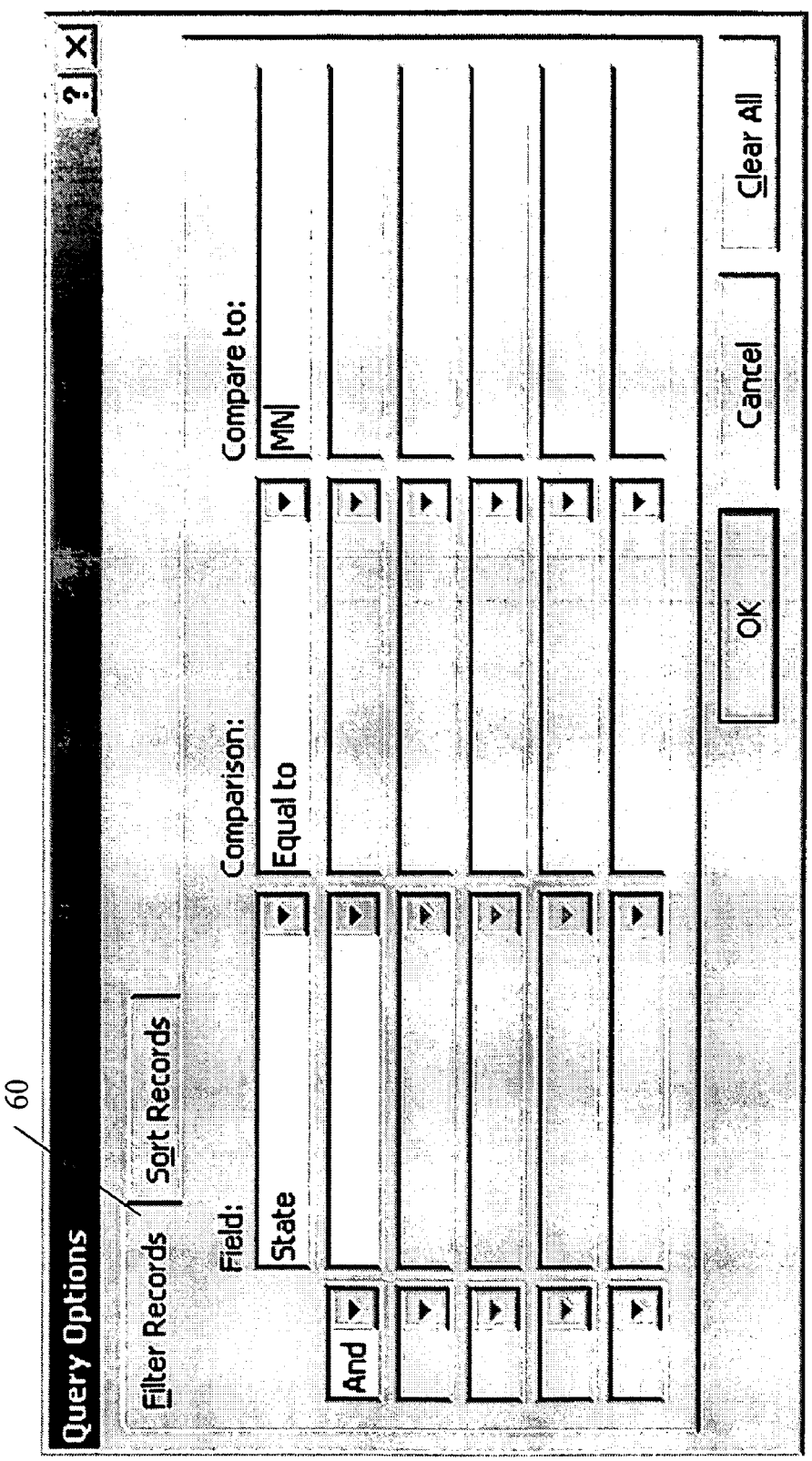
FIGURE 6 – Prior Art

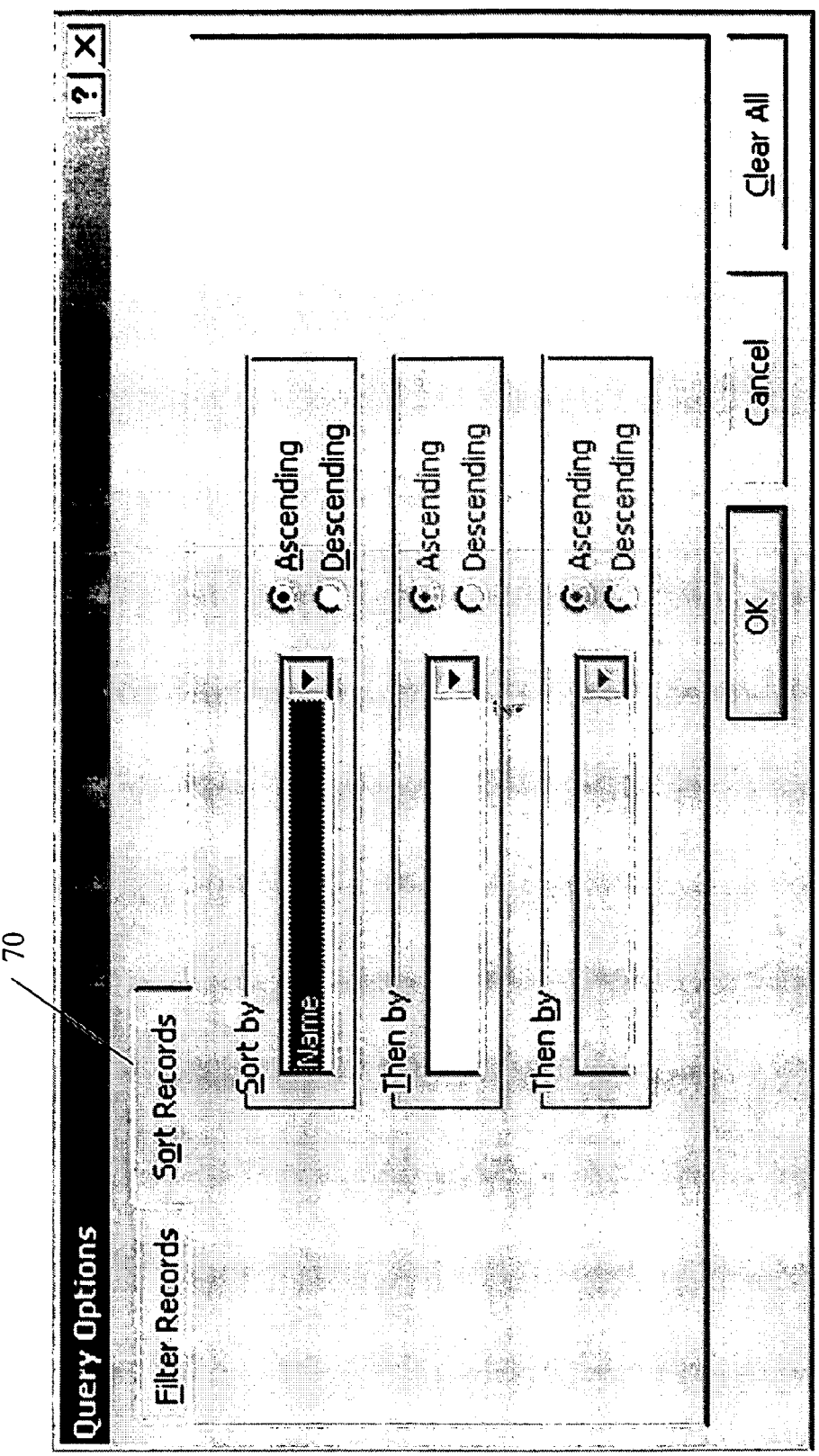
FIGURE 7 – Prior Art

1400 West Franklin Ave.
Minneapolis, MN 55105
Dear Mike Bennett:
We are updating our computer records. We do not have your phone number on file.
Sincerely,
ABC Corporation
Generated Form Letter
FIGURE 8 – Prior Art

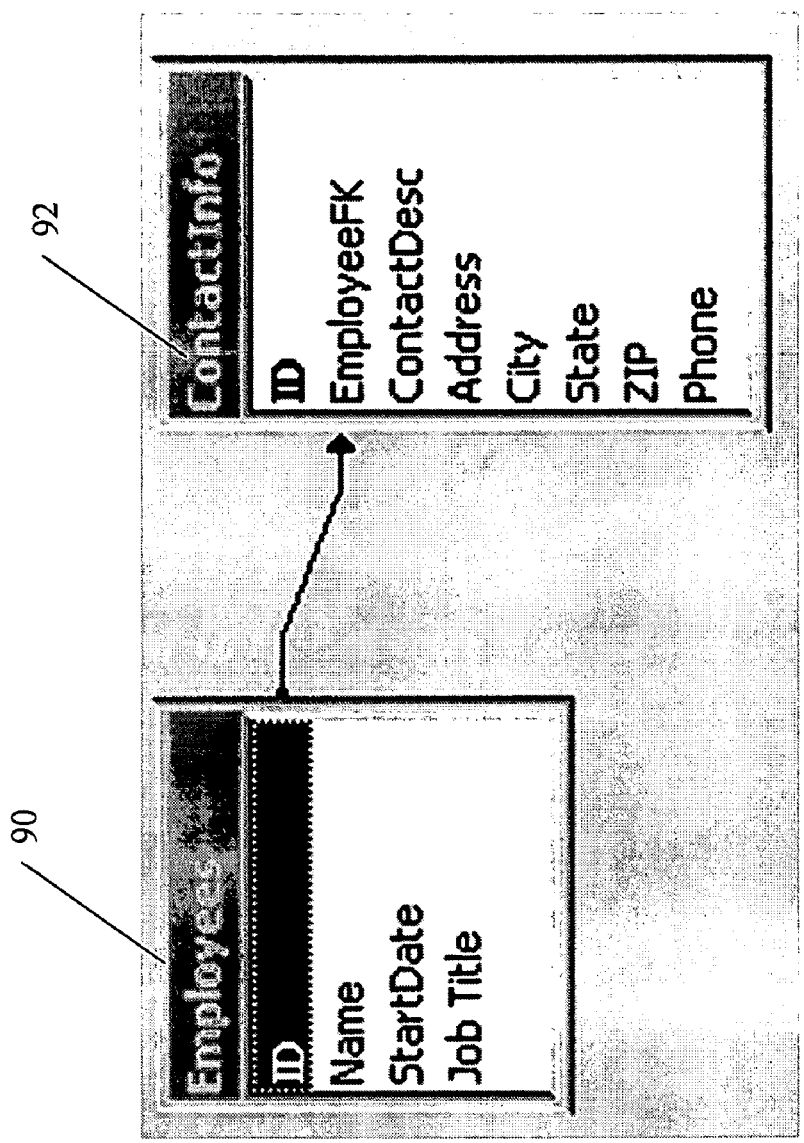
FIGURE 9 – Prior Art
Access Relationships

Employees : Table (100)

| ID | Name | StartDate | Job Title |
|---|---|---|---|
| 1 | Steven Lieske | 6/1/2000 | Senior Associate |
| 2 | Mike Bennett | 8/1/2003 | Associate |
| (AutoNumber) | | | |

Access Table

ContactInfo : Table (102)

| ID | EmployeeFK | ContactDesc | Address | City | State | ZIP | Phone |
|---|---|---|---|---|---|---|---|
| 1 | 1 | Home Address | 2321 Girard Ave South | Minneapolis | MN | 55405 | 612-111-2222 |
| 2 | 1 | Work Address | 45 South 7th St. | Minneapolis | MN | 55402 | 612-333-4444 |
| 3 | 1 | Vacation House | 1901 Highway 1 | Minneapolis | MN | 55333 | 123-333-4444 |
| 4 | 2 | Home | 1400 West Franklin Ave. | Minneapolis | MN | 55105 | |
| 5 | 2 | Work | 35 East 38th St. | Minneapolis | MN | 55832 | 612-838-9228 |
| AutoNumber | 0 | | | | | | |

Access Table

FIGURE 10 – Prior Art

EmployeeReport

Name Steven Lieske
StartDate 6/1/2000
Job Title Senior Associate

| ContactDesc | Address | City | State | ZIP | Phone |
|---|---|---|---|---|---|
| Home Address | 2321 Girard Ave South | Minneapolis | MN | 55405 | 612-111-2222 |
| Work Address | 45 South 7th St. | Minneapolis | MN | 55402 | 612-333-4444 |
| Vacation House | 1901 Highway 1 | Minneapolis | MN | 55333 | 123-333-4444 |

Name Mike Bennett
StartDate 8/1/2003
Job Title Associate

| ContactDesc | Address | City | State | ZIP | Phone |
|---|---|---|---|---|---|
| Home | 1400 West Franklin Ave. | Minneapolis | MN | 55105 | |
| Work | 35 East 38th St. | Minneapolis | MN | 55832 | 612-838-9228 |

SELECT Name, [Job Title], ContactDesc,
Address, City, State, ZIP, Phone
FROM Employees LEFT JOIN ContactInfo
ON Employees.ID = ContactInfo.EmployeeFK;

Access Query

| Name | Job Title | ContactDesc | Address | City | State | ZIP | Phone |
|---|---|---|---|---|---|---|---|
| Steven Lieske | Senior Associate | Vacation House | 1901 Highway 1 | Minneapolis | MN | 55333 | 123-333-4444 |
| Steven Lieske | Senior Associate | Work Address | 45 South 7th St. | Minneapolis | MN | 55402 | 612-333-4444 |
| Steven Lieske | Senior Associate | Home Address | 2321 Girard Ave South | Minneapolis | MN | 55405 | 612-111-2222 |
| Mike Bennett | Associate | Work | 35 East 38th St. | Minneapolis | MN | 55832 | 612-838-9228 |
| Mike Bennett | Associate | Home | 1400 West Franklin Ave. | Minneapolis | MN | 55105 | |

Query Results

FIGURE 12 – Prior Art

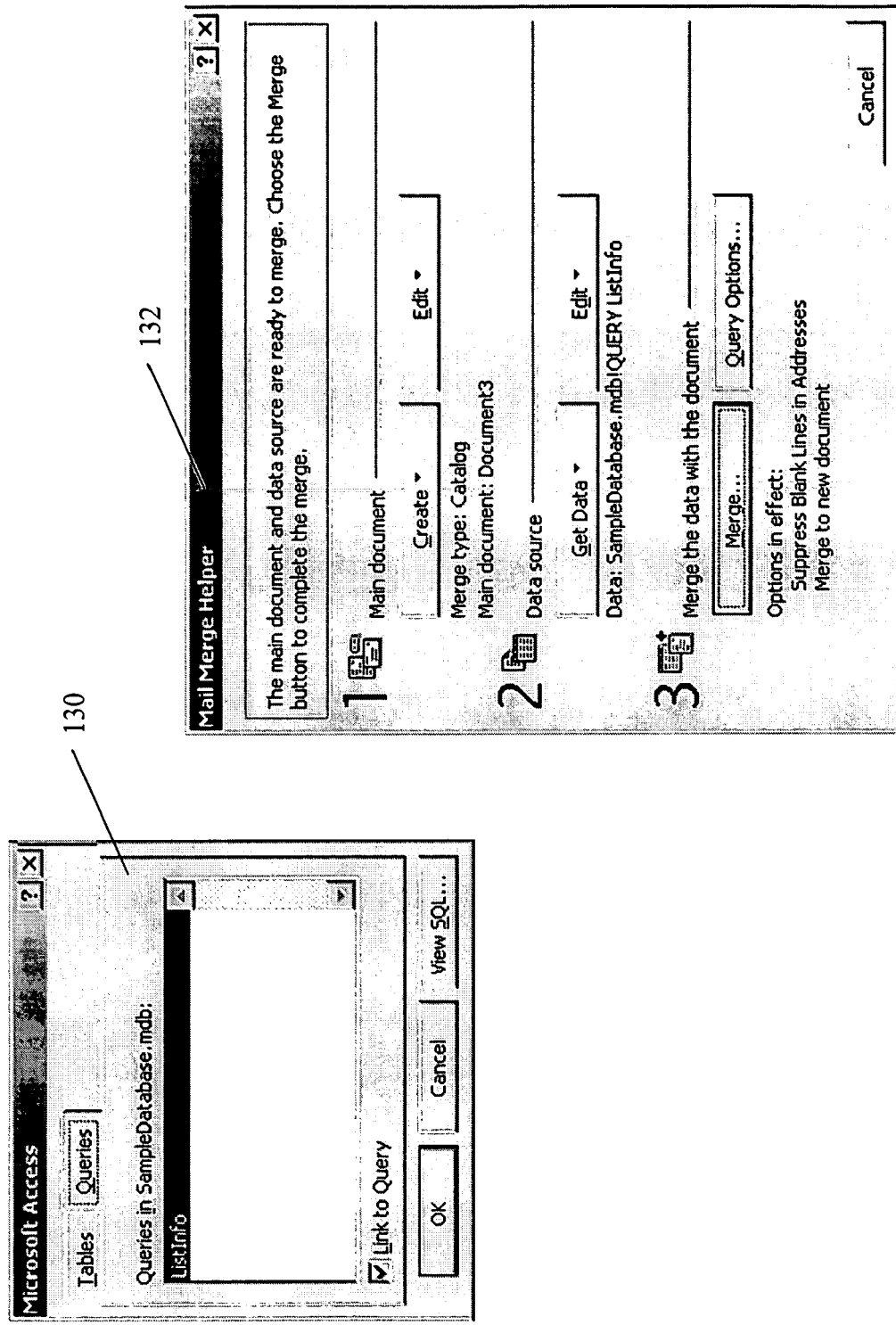
FIGURE 13 – Prior Art

| «Name» | «Job_Title» | «ContactDesc» | «Address» | «State» | «Phone» |

Word Template  /140

| Steven Lieske | Senior Associate | Vacation House | 1901 Highway 1 | MN | 123-333-4444 |
| Steven Lieske | Senior Associate | Work Address | 45 South 7th St. | MN | 612-333-4444 |
| Steven Lieske | Senior Associate | Home Address | 2321 Girard Ave South | MN | 612-111-2222 |
| Mike Bennett | Associate | Work | 35 East 38th St. | MN | 612-838-9228 |
| Mike Bennett | Associate | Home | 1400 West Franklin Ave. | MN | |

/142

Merged Catalog Document

FIGURE 14 – Prior Art

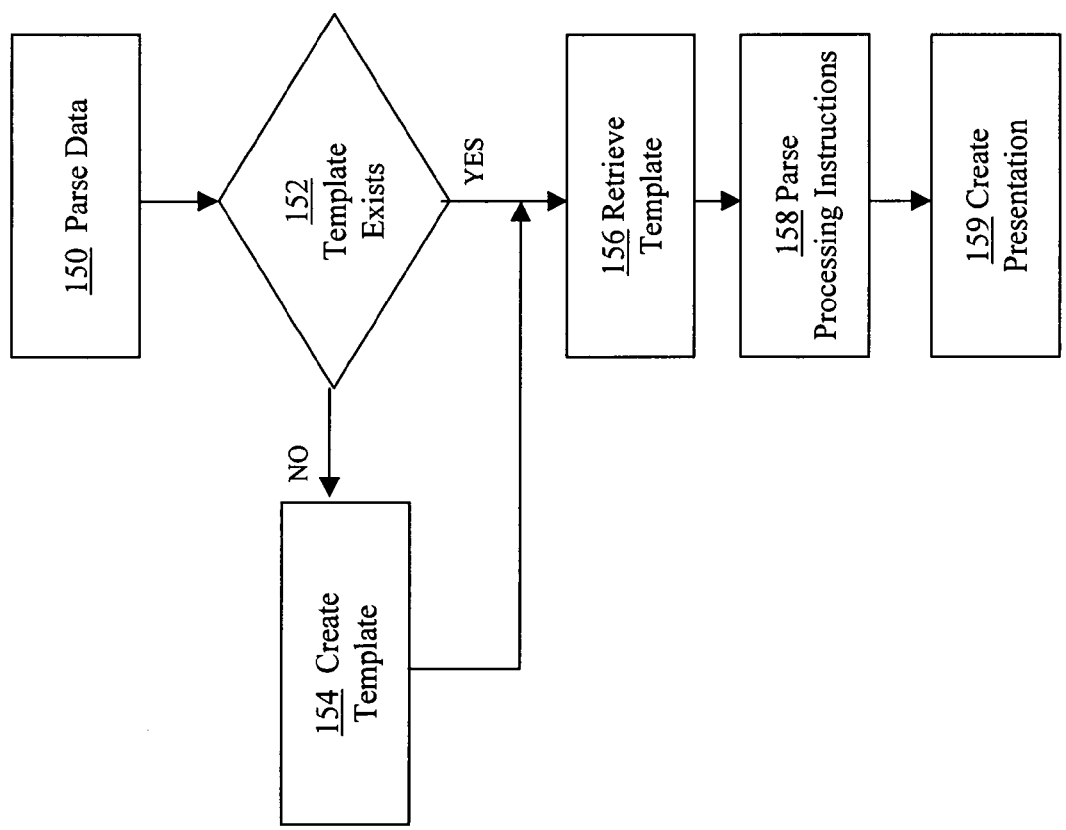

| id | level | type | name | description | rationale | priority | startDate | endDate |
|---|---|---|---|---|---|---|---|---|
| 1 | National | Military | mil-ops-3829 | D1 | R1 | high | 3/5/2003 | 12/31/2003 |
| 2 | National | Military | mil-ops-9220 | D2 | R2 | moderate | 8/15/2002 | 8/15/2005 |
| 3 | National | Military | mil-ops-0989 | D3 | R3 | high | 4/7/2003 | 6/1/2003 |
| 4 | National | Political | pol-ops-8328 | D4 | R4 | low | 11/20/2004 | 12/31/2004 |
| 5 | National | Political | pol-ops-7739 | D5 | R5 | moderate | 2/2/2003 | 7/1/2003 |
| 6 | National | Economic | econ-ops-3892 | D6 | R6 | low | 12/1/2003 | 12/1/2005 |
| 7 | National | Social | soc-ops-0558 | D7 | R7 | low | 6/27/2003 | 6/1/2005 |
| 8 | State | Military | mil-ops-2783 | D8 | R8 | low | 3/18/2004 | |
| 9 | State | Economic | econ-ops-9559 | D9 | R9 | moderate | 9/10/2002 | 12/31/2002 |
| 10 | State | Economic | econ-ops-4518 | D10 | R10 | high | 1/1/2004 | |
| 11 | State | Economic | econ-ops-5811 | D11 | R11 | low | 11/10/2003 | 7/1/2005 |
| 12 | State | Political | pol-ops-3902 | D12 | R12 | high | 7/2/2003 | 11/1/2003 |
| 13 | State | Social | soc-ops-9833 | D13 | R13 | urgent | 9/4/2003 | 9/1/2005 |
| 14 | State | Social | soc-ops-0112 | D14 | R14 | moderate | 12/31/2002 | 12/31/2005 |
| 15 | City | Economic | econ-ops-3358 | D15 | R15 | low | 3/6/2002 | 7/1/2004 |

FIGURE 21

| id | name | label | description | value |
|---|---|---|---|---|
| 1 | mil-ops-3829 | L1 | D1 | V1 |
| 2 | mil-ops-3829 | L2 | D2 | V2 |
| 3 | mil-ops-3829 | L3 | D3 | V3 |
| 4 | mil-ops-3829 | L4 | D4 | V4 |
| 5 | mil-ops-3829 | L5 | D5 | V5 |
| 6 | mil-ops-9220 | L6 | D6 | V6 |
| 7 | mil-ops-9220 | L7 | D7 | V7 |
| 8 | mil-ops-9220 | L8 | D8 | V8 |
| 9 | mil-ops-9220 | L9 | D9 | V9 |
| 10 | mil-ops-0989 | L10 | D10 | V10 |
| 11 | mil-ops-0989 | L11 | D11 | V11 |

FIGURE 22

National Objective
MILITARY
Details
mil-ops-3829

- Description:
  - -D1
- Rationale:
  - -R1
- Priority: High
- Start Date: March 5, 2003

FIGURE 25

National Objective
NATIONAL
Details
mil-ops-3829

| Indicator | Description | Value |
|---|---|---|
| L1 | D1 | V1 |
| L2 | D2 | V2 |
| L3 | D3 | V3 |

FIGURE 26

National Objective
MILITARY
Details
mil-ops-9220

- Description:
  - -D2
- Rationale:
  - -R2
- Priority: Moderate
- Start Date: August 15, 2002

FIGURE 27

National Objective NATIONAL
Details
mil-ops-9220

| Indicator | Description | Value |
|---|---|---|
| L6 | D6 | V6 |
| L7 | D7 | V7 |
| L8 | D8 | V8 |
| L9 | D9 | V9 |

PRESENTATION GENERATOR

RELATED APPLICATION

This application claims the benefit of U.S. Provisional Application No. 60/494,606, filed Aug. 12, 2003, titled "Presentation Generator", which is incorporated herein by reference.

STATEMENT REGARDING GOVERNMENT SUPPORT

This invention was made with Government support under GS-35F-4692G awarded by the United States Air Force. The Government has certain rights in this invention.

BACKGROUND OF THE INVENTION

This invention relates to a software system, specifically to a system that automatically generates a presentation, document, or other formatted product in an application format for an end user based on a template and structured data.

Users of computer systems desire to see and share data with familiar user-friendly computer products, such as word processors, spreadsheets, databases and presentation software. Computer systems themselves often do not have the ability to produce products in such user-friendly formats. In the few systems that allow data to be exported to such user-friendly products, users have little control in customizing the results since formatting is usually hard coded within the system. Such hard coded solutions also result in support of only a single type of data structure. Thus, when the end user wishes to see and share data in a user-friendly product based on another of the system's data files, this new use must also be hard coded.

What is needed is a way to allow a computer end user to generate a slide show, document, spreadsheet or other presentation using a word processor or other user-friendly product, based (in part) upon structured data from a software system. Such an innovation should allow the end user to specify the layout of the presentation as well as how to organize the data records and which data records to include.

Traditional Mail Merge Functions and their Limitations

Microsoft WORD currently provides a mail merge helper feature. Variations of the mail merge feature are also available in other word processing software systems. The mail merge is designed to assist a user to create form letter documents and associated envelopes or mailing labels. As WORD's help file explains, mail merge feature guides the user through organizing the address data, merging it into a generic document, and printing the resulting personalized documents.

To allow for a comparison between current systems and the novel features offered by the present invention, the WORD mail merge helper feature will now be discussed at length, with the example of using the feature to generate form letters to a set of customers. As one in the art is aware, Microsoft Corporation produces the ubiquitous OFFICE suite of software products, which includes WORD for word processing, POWERPOINT for slide shows and other presentations, and EXCEL for spreadsheets. While the present document specifically discusses Microsoft products, the present invention may also be compared to, and implemented in connection with other computer-based applications available to end users. For example, end users may also enjoy the present invention (in various embodiments) with WordPerfect's office suite that includes the WORDPERFECT word processor, QUATTRO PRO spreadsheet, PRESENTATIONS slide show creator and the PARADOX database product. Or end users may choose to use software from other vendors, such as CRYSTAL REPORTS or the STAROFFICE suite from Sun Microsystems, to name but a few. Some embodiments of the present invention may support using web portlets (i.e., modules that can be plugged into a web portal for real-time data searching capabilities), exporting to web services in XML or other format, or leveraging the ODBC protocol for access to other types of data sources.

FIG. 1 shows the dialog box 10 for WORD's mail merge helper feature. The user may use the "Get Data" button 12 to associate a data file with the mail merge. FIG. 2 shows the EXCEL spreadsheet data file 20 that is being used as the data file in this example. Here, each column is given a field name and each row represents one data record. Thus, the second row contains the data for Steven Lieske and the third row contains the information for Mike Bennett. The mail merge feature can also use a database file, a text file or a table in a WORD document as the data file.

Once the data file has been set up, the user creates or edits the main document 14, which is the template for the merge. FIG. 3 shows a sample document created in WORD. The document includes generic text that will be included in each form letter, such as the sentence: "We are updating our computer records." The document also contains a series of merge tags 32 and 34 that are used to personalize each form letter. The merge tags may be a placeholder to a data field or may be a simple processing instruction. FIG. 4 shows WORD's "Insert Merge Field" button 40, which allows the user to see all of the field names from the spreadsheet 20 and to choose which field names should be included in the template. In the example shown in FIG. 3, the fields 32 called NAME, ADDRESS, CITY, STATE and ZIP are all included in the template.

The mail merger helper feature also supports nine merge instructions that are accessed by the "Insert Word Field" button 50 shown in FIG. 5. The ASK and FILL-IN merge instructions can be inserted in a template to require the user to type in information from the keyboard as the merge is generating the form letters. With these two instructions, the user must be an active participant during the merge process since his or her keyboard input is required for each letter.

The IF-THEN-ELSE merge instruction provides conditional processing for text in the form letters. The template shown in FIG. 3 includes one of these IF-THEN-ELSE merge instructions 34. This instruction 34 tests the PHONE field for the record being used for each form letter. If the PHONE field is not blank (i.e., < >" "), then the text "Our records indicate your phone number is" is added to the form letter followed by the value of the present record's PHONE field. If, however, the PHONE field is blank, then the 'else' portion of the merge instruction causes the text "We do not have your phone number on file" to be added to the form letter.

The MERGE-RECORD-# merge instruction simply includes in the resulting form letter the number of the record being processed. For example, if the merge feature is using the fifth record's information to create the fifth form letter, then the number "5" is inserted where the MERGE-RECORD-# instruction is placed in the template.

In similar fashion, the MERGE-SEQUENCE-# merge instruction inserts in the form letter the total number of records being processed. For example, if the user decides to generate 10 form letters by processing records one through ten, then the number "10" is inserted where the MERGE-SEQUENCE-# instruction is placed in the template.

The NEXT-RECORD merge instruction causes the mail merge feature to proceed to the next record in the data file 20. This may allow a form letter to be a list reporting the data from several records. For example, the merged form letter may be set up to print the NAME and PHONE on a single page. The NEXT-RECORD-IF and SKIP-RECORD-IF merge instructions are similarly used to proceed to the next record on a single page, but these instructions provide a condition that must be met for either the next record to be processed or the next record to be skipped. The conditions allowed by these two merge instructions are similar to the IF portion of the IF-THEN-ELSE merge instruction discussed above.

The final merge instruction supported by WORD's mail merge helper is the SET-BOOKMARK merge instruction, which inserts the text associated to a specified bookmark.

Once the template has been created with the desired merge fields and word fields, the user may set up a query 16 to instruct which records should be included in the merge and how they should be sorted. FIG. 6 shows the FILTER RECORDS 60 dialog box that allows the user to select the criteria for inclusion in the form letters. Here, only records that have the STATE field set to MN will be used. FIG. 7 shows the SORT RECORDS 70 dialog box that allows the user to select the sorting rules for the form letters. Here, the records will be sorted by the NAME field.

Once the template is finished and the data file is selected, and once any filters or sorting requirements are set up, the user may generate the merged form letters 18. As the data file from FIG. 2 only includes two records with the STATE equal to MN, only two form letters are generated. FIG. 8 shows the results for the second form letter 80. Unfortunately, the chosen data file, the filters and the sorting requirements are all details that the user must set up each time the mail merge is processed. The data file name, the filters and the query itself may not be embedded within the template. What is needed is a way to embed such information into the template. Furthermore, what is needed is a way to allow the template to requery the data or to query a second data source as part of merging the data.

The mail merge helper uses data from a text file or WORD table in much the same way as data from an Excel spreadsheet is used. These types of data files present information as a series sequential data records that are then processed in turn. The template must be set up to generate a single letter, label or address for each processed record. What is needed is way to present highly structured data in an advanced format.

The mail merge helper includes two aspects that may seem to offer such functionality. These are the catalog merge type and the ACCESS database data source. But even these are quite limited, as is shown in FIGS. 9 through 14.

A computer user may use ACCESS or similar relational database to store data, such as the data for company employees, for example. As one skilled in the art knows, such a relational database is a collection of data items organized as a set of formally-described tables from which data can be accessed or reassembled in many different ways without having to reorganize the database tables.

FIG. 9 shows two tables set up in ACCESS for storing information about employees. The design for the Employees table 90 states that it stores the employee's ID, name, start date and job title. The design of the ContactInfo table 92 states that it stores the address, city, state, ZIP and phone for a contact. Employees may have several contacts. For example, an employee may have a home address, a work address, and perhaps a sabbatical address. FIG. 10 displays the Employees table 100 and ContactInfo table 102 with data for two employees. Per the relationship between the tables shown in FIG. 9, the ID field of the Employees table 100 is used as the foreign key (i.e., EmployeeFK) for the ContactInfo table 102. Thus, the Steven Lieske employee has three ContactInfo records (i.e., 1, 2 and 3) and the Mike Bennett employee has two ContactInfo records (i.e., 4 and 5).

FIG. 11 illustrates a report 112 created in ACCESS that prints out the full information for both of the employees. Here one sees the employee information for each employee as well as all associated contact information. Notice that while Steven Lieske has three contact addresses, his name only appears once rather than three times. In other words, the reports displays the data for each employee in a non-repetitive, easy-to-understand format. With such a report, even if Mike Bennett had 100 contact addresses set up in the database, they would all be included in the report without any additional programming effort.

The mail merge helper in WORD supports ACCESS database data. However, it does not support even as much functionality as the report writer does in ACCESS. As a first step, FIG. 12 shows a SQL query 120 and query result 122 to gather all of the information that is found in the report shown in FIG. 11. FIG. 13 shows the mail merge helper 132 again, but this time the data source selected is the ACCESS database. As the mail merge helper does not support databases very well, one must choose a query defined in the database or else set up such a query on the fly. Here, the ListInfo query 130 from FIG. 12 is selected. Once again, only one query is allowed and it must be set up by the end user just before performing the merge. The query may not be embedded within and saved as part of the template file.

The mail merger helper 132 also shows that the merge type is "Catalog" for this example rather than form letter. This type of merge is used when information from several records is gathered together rather than each record producing a separate document. FIG. 14 shows the template 140 that may be set up and then the resulting merged document 142 that is generated by merging the results of the ACCESS query 120 with the catalog template 140. Comparing these merged results 142 with the report shown in FIG. 11, one can see the limitations of the mail merge helper. Rather than grouping the data in a logical format, the mail merge creates repetition with each row including the redundant employee name and job title.

The functionality shown in FIGS. 1 through 14 illustrate some of the shortcomings of the present art. While the WORD mail merge helper does well in producing standard form letters, envelopes and mailing labels, it does not offer various advanced features that are also lacking elsewhere in the art. Mail merge only allows for the creation of WORD documents. What is needed is a way to merge data into templates created with other desktop applications to produce other types of documents.

Mail merge only supports spreadsheets, databases, text files and WORD tables as the data source. Unfortunately, most business systems do not store their data in one of these formats. What is needed is a system that accepts structured data in other formats, such as XML data files.

Mail merge may use a query to choose the records to apply to the merge as well as its ordering. What is needed is a system that can include multiple queries and that can alternate between reporting data on a record by record basis and reporting data aggregated in a table (or with bullets or a list).

BRIEF SUMMARY OF THE INVENTION

In one aspect of the present invention, a presentation generator may access a data file or other data source that is structured into a set of data fields. The generator may present a user with a listing of tags, including tags that correspond to the various data fields for one or more data sources. The user may create a new template or modify an existing template by inserting one or more tags in the template, or the user may rely on a template that already has tags inserted in it. The user may indicate processing instructions for the template. The generator processes the data with the template based on the tags and the instructions. The processing instructions may include one or more queries for the data source.

It is one object of the invention to provide a way to create a presentation through a user-friendly software application based on a data from a computing system, a data file, a database or other data source. It is another object of the invention to allow the user to set up the formatting of the presentation using processing instructions rather than requiring hard coding. Yet another object is to allow the user to indicate which records from a data source should be included in the presentation. One object of the invention is to allow multiple queries of the data source. Another object of the invention is to allow more than one data source to be used in building the presentation. Yet another object is to allow pages, slides, sections, etc. of the presentation to be grouped together, with the group repeated for each change in a specified data field. Another object of the invention is to allow a presentation to be updateable by the end user so that the presentation more accurately reflects the contents of the data source.

BRIEF DESCRIPTION OF THE DRAWINGS

FIG. 1 shows the prior art system of the mail merge helper from WORD.

FIG. 2 shows the prior art system of data set up in EXCEL.

FIG. 3 shows the prior art system template in WORD.

FIG. 4 shows the prior art system's Insert Merge Field button.

FIG. 5 shows the prior art system's Insert Word Field button.

FIGS. 6 and 7 show the prior art system Query Options feature of the mail merge helper.

FIG. 8 shows the prior art system's merged letter from a template and data.

FIG. 9 shows the prior art system as two related tables in ACCESS.

FIG. 10 shows the prior art system as data in the two ACCESS tables.

FIG. 11 shows the prior art system as an ACCESS report.

FIG. 12 shows the prior art system as a SQL query and its results in ACCESS.

FIG. 13 shows the prior art system mail merge helper accessing the ACCESS database.

FIG. 14 shows the prior art system's catalog-type template and resulting merged document.

FIG. 15 shows a flowchart of one embodiment of the invention generating a presentation.

FIGS. 21 and 22 are matrices listing sample data.

FIGS. 24 to 28 show five pages from a presentation generated based on the template of FIGS. 23A, 23B and 23C and the data of FIGS. 21 and 22.

FIGS. 30 through 36 are dialog boxes available in another embodiment of the invention.

DETAILED DESCRIPTION OF THE INVENTION

Figure 16:
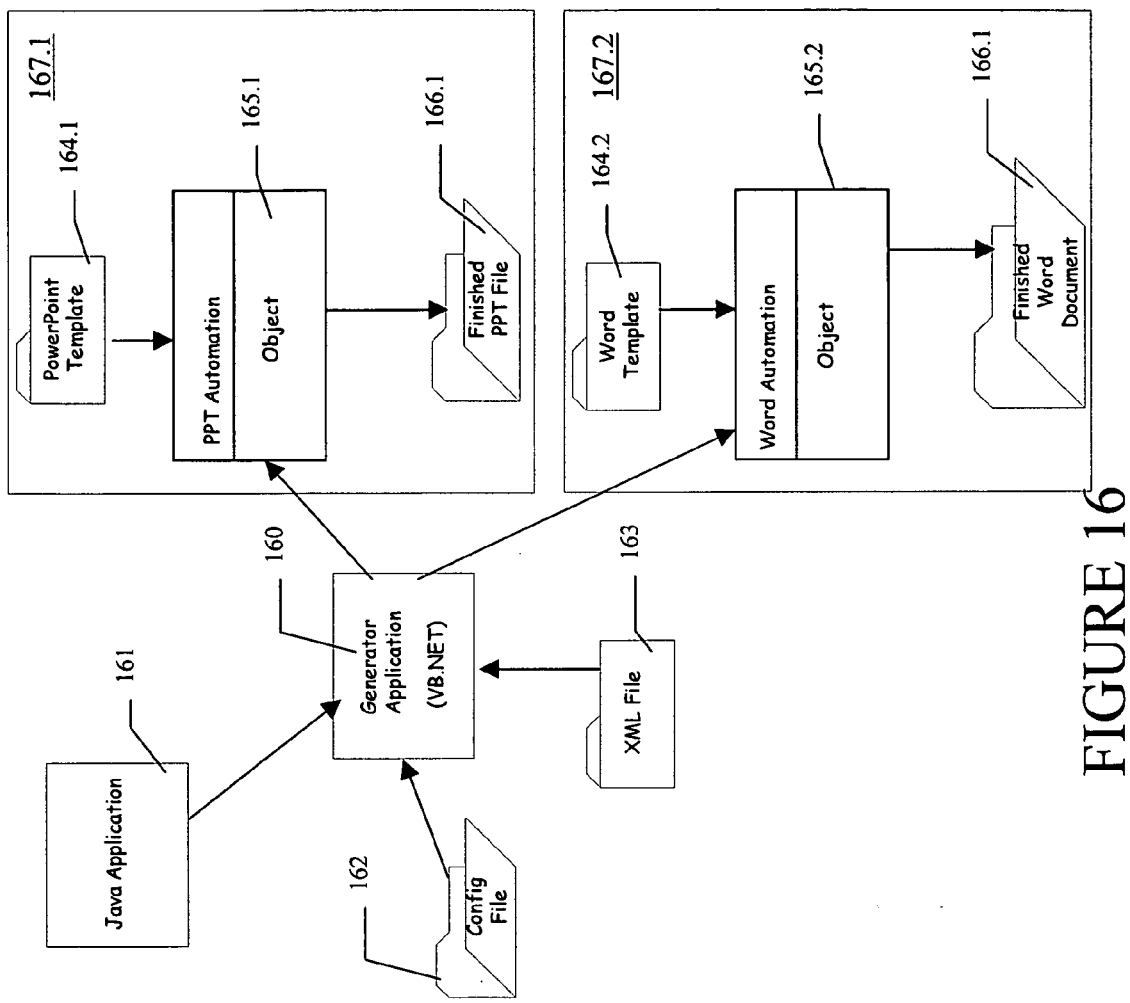
FIG. 16 shows a diagram of one embodiment of the invention interfacing with PowerPoint and Word to generate a presentation.

The present invention enables an end user to use a template to create a presentation file based on one or more data sources. The template includes one or more tags that are mapped to fields in the data sources as well as one or more processing instructions that control how the data sources are queried and how the regions of the template are positioned within the presentation. One skilled in the art may create various software systems to accomplish the methodology of the present invention. One of the many various software systems is shown starting with FIG. 15. In such an embodiment, a system parses one or more data files 150 or other data sources to determine the field structure of the data. A user may choose to create a new template, revise an already existing template, or rely entirely on an already existing template 152 & 154. If the user chooses to create a new template 154, the user accesses a user-friendly software application to set up the template. In one embodiment, the user may choose from any of a number of user-friendly software applications, such as those developed by Microsoft (including the WORD word-processor, the EXCEL spreadsheet program and the POWERPOINT slide presentation program) or other vendors. Other embodiments of the invention may support other user-friendly applications.

To set up the template, the user may insert processing instructions, such as special tags into the location of the template where certain data fields should be inserted for the resulting presentation. In one embodiment, the user may insert such tags using the drag-and-drop technique with a listing of available tags. In another embodiment, the user may type the tags manually using a supported notation. In addition to arranging field tags in the template, the processing instructions may be queries, sorting requirements, etc. The processing instructions may also provide the system with information on how a series of pages or sections of the template are grouped or how they relate to the data. In one embodiment, such processing instructions are entered by the user in a specific location of the template, such as a notes section or a comments section.

Referring back to FIG. 15, once the template set up, the user may initiate an instruction for the system to generate the presentation. To do this, the system may retrieve the template 156 and parse the processing/merge instructions 158. Based on these processing instructions, the system may create a presentation 159 of one or more pages by inserting the desired data fields in the tagged locations of the template. The term "pages" is not limited to the traditional meaning of a page, but also means "slide", "chapter", "section" or some other type of dividing unit within the presentation.

FIG. 16 shows a diagram of one embodiment of the invention interfacing with PowerPoint and Word to generate a presentation. As shown in the figure, data from a computer system may be accessed as an XML file 163. The attribute names from the XML file's attribute-value pairs can be used to create and modify PowerPoint templates 164.1 and Word templates 164.2. In embodiments accepting such XML data files, an XSD or other definition file that defines the data structure of the XML file may be accessed. A generator application 160 may be written in VB.NET or other computer language. The generator application 160 may be kicked off by a Java application 161 to either create/modify templates or to generate the presentations. A user may interact with the GUI interface to the generator application 160 to indicate which template and which XML file to process. The generator 160 may then spawn automation objects 165. For example, a PowerPoint automation object 165.1 may load the appropriate PowerPoint template 164.1 and process the instructions to generate a PowerPoint slide show file 166.1 made up of a series of slides.

Generating a Presentation

Figure 17:
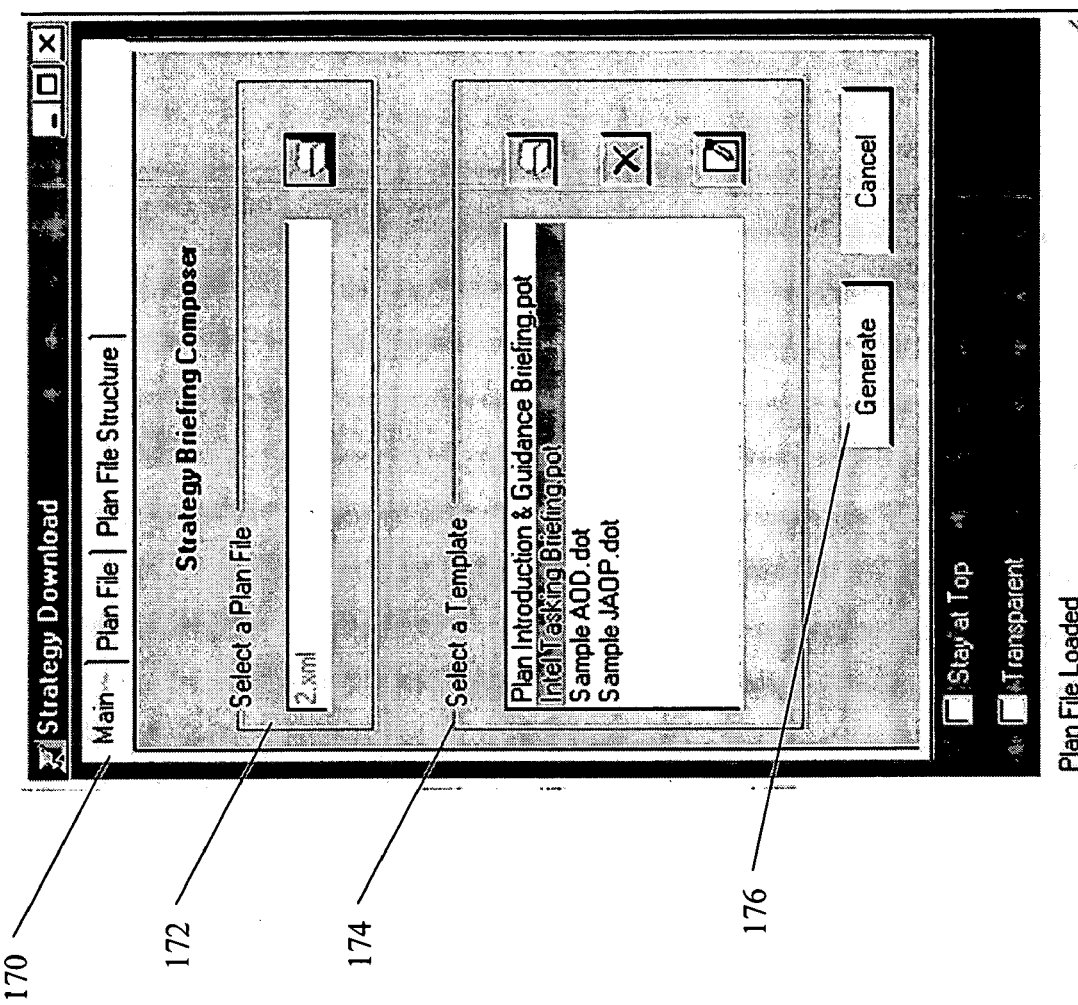
FIGS. 17, 18 and 19 are dialog boxes available in one embodiment of the invention.

FIG. 17 shows the first tabbed dialog box for one embodiment of the user interface of the present invention. As shown in FIG. 17, the data source (i.e., "plan") from which the presentation (i.e., "briefing") is to be generated may be displayed in the 'Select a Plan File' area 172. On clicking the 'Browse' button next to this field, a File Chooser window may open to allow the user to browse through the file directory and specify an XML file that will be used to generate a briefing presentation. When the user selects a file and clicks OK, the filename may populate the Plan File field 172. The file that the user selects may be validated before processing.

The template(s) to be used for the briefing presentation generation may be displayed in the "Select a Template' field 174 as a list. The end user may add templates to the list using the 'Browse' button. This button may bring up a File Chooser window to allow the user to browse through the file director and specify a .pot or .dot file. When the user selects a file and clicks OK, the filename may be displayed in the template list. The user may delete one or more templates from the list by selecting the template(s) to be deleted, and clicking the 'Delete' button. This may remove the templates from the list, but not delete the template(s) from the hard drive or other secondary storage device. The user may edit a template by highlighting the template to be edited and clicking the 'Edit' button.

In one embodiment of the present invention, commonly used settings, such as plan files and templates may be saved to a file, to a collaborative web service, etc. so that such settings may be used among a group of users. This sharing may increase the ease of use of the invention.

Once a plan data source file 172 has been loaded, and a template 174 has been selected, the user may click on the 'Generate' 176 button to start the process of generating the merged briefing presentation. A date filtering window may display at this point, allowing the user to enter the specific date range for which he/she wants to generate the briefing. After entering the date range and clicking 'OK', a progress window may display for showing status descriptions to the user. The data source file may be first converted to a hierarchical format and stored in memory. If the conversion to hierarchical format completes successfully, the converted data source may be filtered based on the date filters specified.

The process differs now depending on the type of presentation is being created. If the presentation is a Microsoft WORD or similar document, Microsoft Word (or other program) may start and the briefing may be generated based on the template and the data from the data sources.

If however, the presentation is a Microsoft POWERPOINT slide show or similar presentation slide show document, then a dialog box may display on top of the progress bar, informing the user of the estimated number of slides that will be generated, and the estimated time for completion. If a successful generation is not guaranteed, the user may be alerted at this point, so that he/she can cancel the process. The number of slides may be estimated based on the processing instructions in the template. The time may be estimated based on the complexity of the template and the plan using a formula, such as: Time in seconds=((No. of rows/Tables+No. of slides)*Common factor)/60. In one embodiment, the common factor may be set up at perhaps 4.65.

A "no guarantee" message may be displayed on the screen if the number of processes is greater than 3200 or the total number of table rows is greater than 800, for example. The number of processes may be calculated by adding the number of rows per table with the number of slides in the template. If the user clicks 'Cancel' on the estimate window, the generation may be canceled. If the user clicks 'Ok', Microsoft PowerPoint may open up and the generation may take place.

Figure 18:
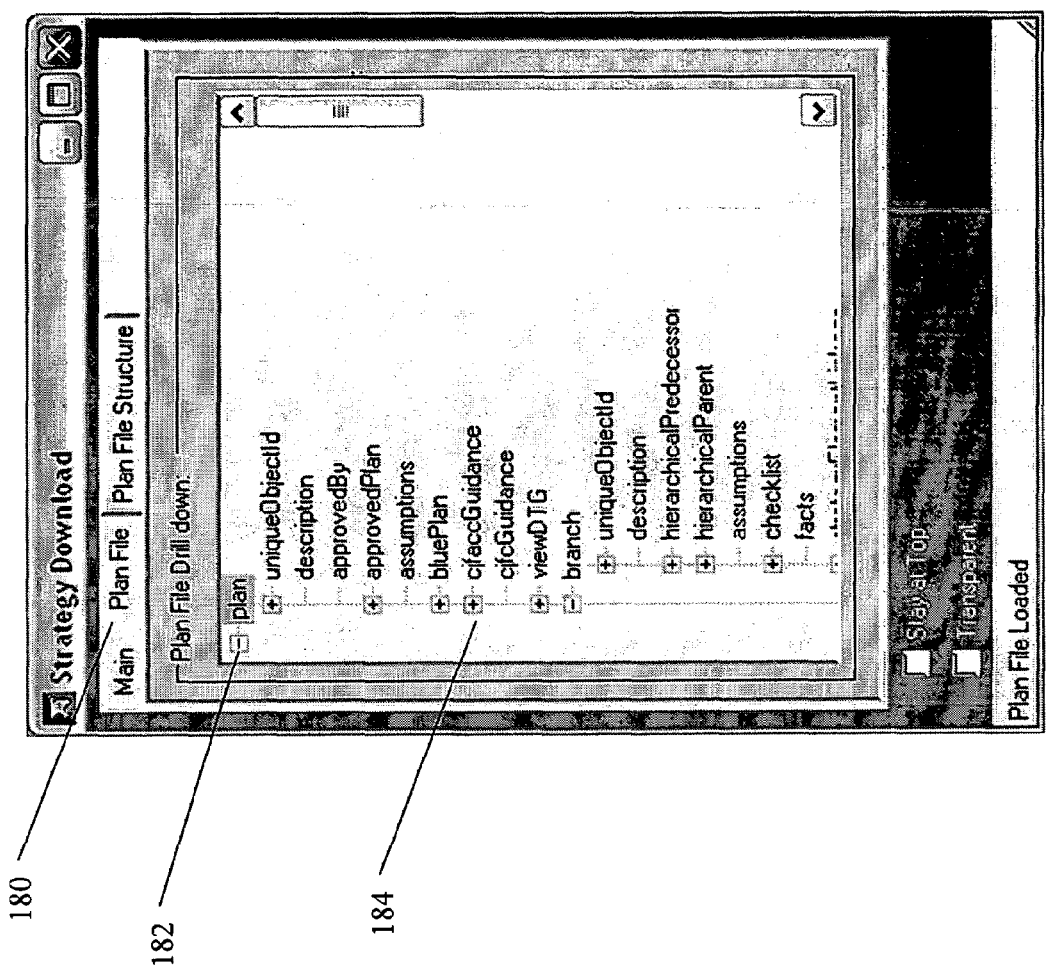

The second tabbed dialog window of one embodiment is shown in FIG. 18. Here, the Plan File tab may contain a tree-view structure of the selected XML plan file(s) (data sources). The user may expand and collapse nodes (see 182 and 184) to see the whole plan. When the user clicks on the 'Generate' button in the Main tab to generate a briefing, the Plan File tab may be updated to show the tree-view structure of the converted hierarchical data source. While customizing templates, the user may drag and drop elements from the Plan File tab to the Word template, and a reference to the path of the element may be displayed in the template. For example, if the user drags and drops the 'assumptions' field from the 'Plan File' tab to a template, the processing instruction {plan/assumptions} may be inserted in the template file.

One embodiment of the present invention may allow nicknames to be used rather than actual data field names. For example, rather than showing in this tree-view structure the field "ccINdata", the invention may allow the nickname "Commander's Intent" to be used in place of ccINdata. Or such nicknames may be supported in the slides themselves so that a user may more readily understand the slide template.

As one skilled in the art will recognize, the use of a tree-view or other view of the data may assist the user in building searches across multidimensional structured data, and is not limited to only two-dimensional data results, such as those found in relational databases.

Figure 19:

The third tabbed dialog window of one embodiment is shown in FIG. 19. Here, the Plan File Structure tab may contain a tree-view structure of the selected data source. The user may expand and collapse nodes to see the whole plan. When the user clicks on the 'Generate' button in the Main tab to generate a briefing, the Plan File Structure tab may be updated to show the tree-view structure of the converted hierarchical data source file. While customizing templates, the user may drag and drop elements from the Plan File tab to the Word template, and a reference to the element will be displayed in the template. For example, if the user drags and drops the 'assumptions' field from the 'Plan File Structure' tab to a template, the {assumptions} processing instruction tag may be inserted in the template.

In addition to mapping the data structure using a tree-view method where the data fields are shown as a hierarchy, one embodiment may provide a relational mapping method, where data in one entity links or relates to data in another entity. In such an embodiment, the links or relationships may be based on a key or other ID, for example.

Figure 20:
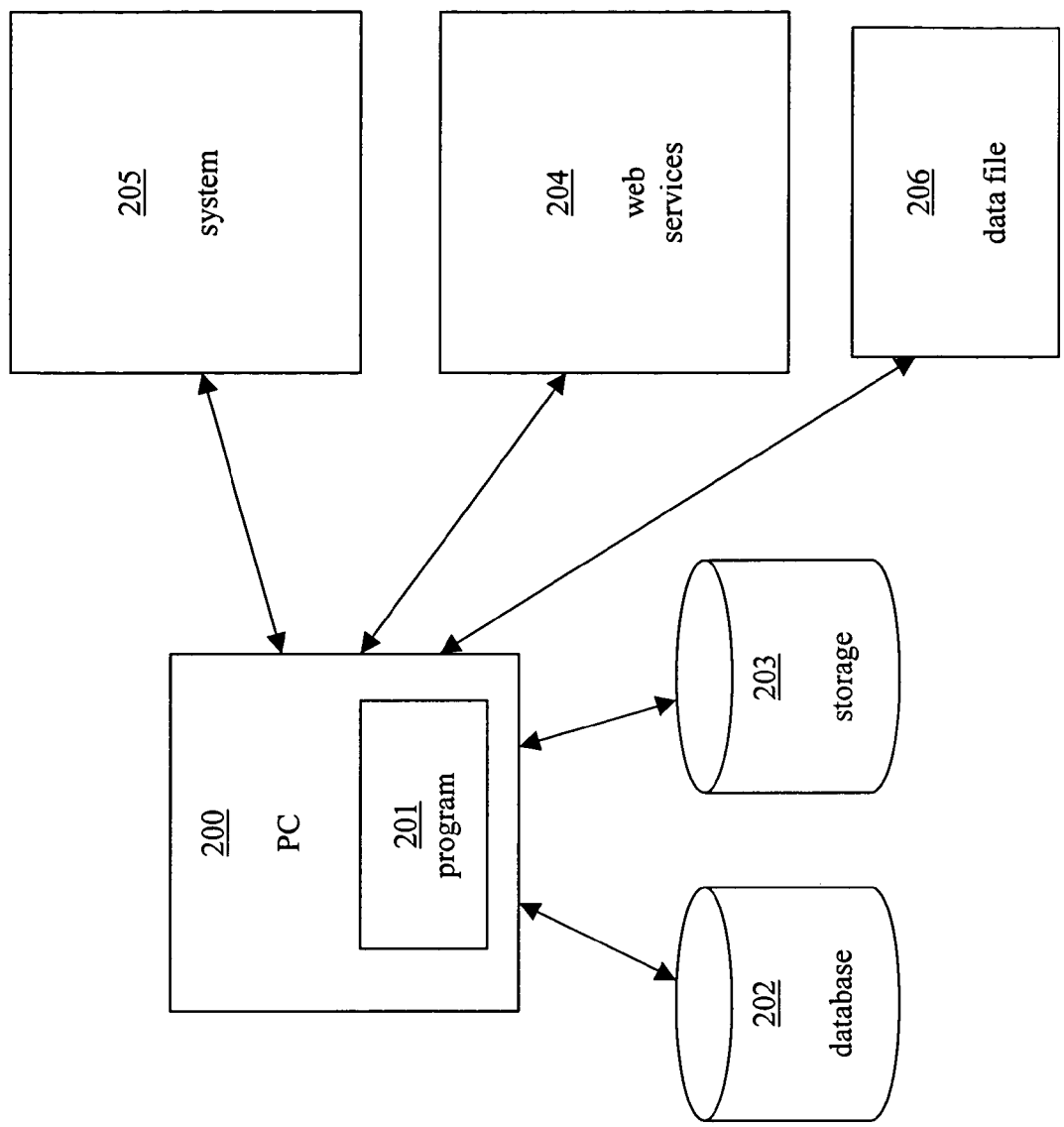
FIG. 20 is a block diagram showing a system and a computer program for one embodiment of the invention.

FIG. 20 shows a block diagram of one embodiment of a computer system using a computer program to generate presentations. In FIG. 20, a PC or other general purpose computing device (such as a PDA or laptop) 200 has stored on it one or more computer programs 201 that provide the functionality of the present invention in one of its embodiments. Data to be used to build the presentations may be extracted from one or more databases 202, other computing systems 205, web services 204, data files 206, or other data sources, for example. Templates and the resulting presentations may be stored on a disk 203 or other storage.

FIGS. 21 and 22 are matrices that show a representation of data fields and data that may be accessed from a database 202, data file 206, other computing system 205, etc. The sample data shown in FIG. 21 is shown for illustrative purposes on how a presentation may be generated using data that represents a series of projects being handled by an organization. Each project has a level, type, name, description and other data fields. FIG. 22 is a second listing showing further sample data for the projects first shown in FIG. 21. As indicated by these two figures, the data used by embodiments of the present invention may exist in more than one database table, data file, web service, etc. A person skilled in the art will readily understand the numerous ways in which data can be stored and transmitted. For example, one embodiment of the invention may include an XML parser so that the data can be represented in XML format. For example, data for the first project shown in FIG. 21 may be structured as a series of XML tags having attribute-value pairs, such as the tags shown in Table 1.

TABLE 1

```
<project>
    <attribute name='id'              value='1' />                </attribute>
    <attribute name='level'           value='national' />         </attribute>
    <attribute name='type'            value='military' />         </attribute>
    <attribute name='name'            value='mil-ops-
                                      3829' />                    </attribute>
    <attribute name='description'     value='D1?' />              </attribute>
    <attribute name='rationale'       value='R1?' />              </attribute>
    <attribute name='priority'        value='high' />             </attribute>
    <attribute name='startDate'       value='3-5-2003' />         </attribute>
    <attribute name='endDate'         value='12-31-2003' />       </attribute>
    <attribute name='indicator'>
        <attribute name='label'          value='L1' />            </attribute>
        <attribute name='description'    value='D1' />            </attribute>
        <attribute name='value'          value='V1' />            </attribute>
    </attribute>
    <attribute name='indicator'>
        <attribute name='label'          value='L2' />            </attribute
        <attribute name='description'    value='D2' />            </attribute
        <attribute name='value'          value='V2' />            </attribute
    </attribute>
    <attribute name='indicator'>
        <attribute name='label'          value='L3' />            </attribute
        <attribute name='description'    value='D3' />            </attribute
        <attribute name='value'          value='V3' />            </attribute
    </attribute>
    <attribute name='indicator'>
        <attribute name='label'          value='L4' />            </attribute
        <attribute name='description'    value='D4' />            </attribute
        <attribute name='value'          value='V4' />            </attribute
```

TABLE 1-continued

```
    </attribute
    <attribute name='indicator'>
        <attribute name='label'          value='L5' />            </attribute
        <attribute name='description'    value='D5' />            </attribute
        <attribute name='value'          value='V5' />            </attribute
    </attribute
</project>
```

Figure 23A:
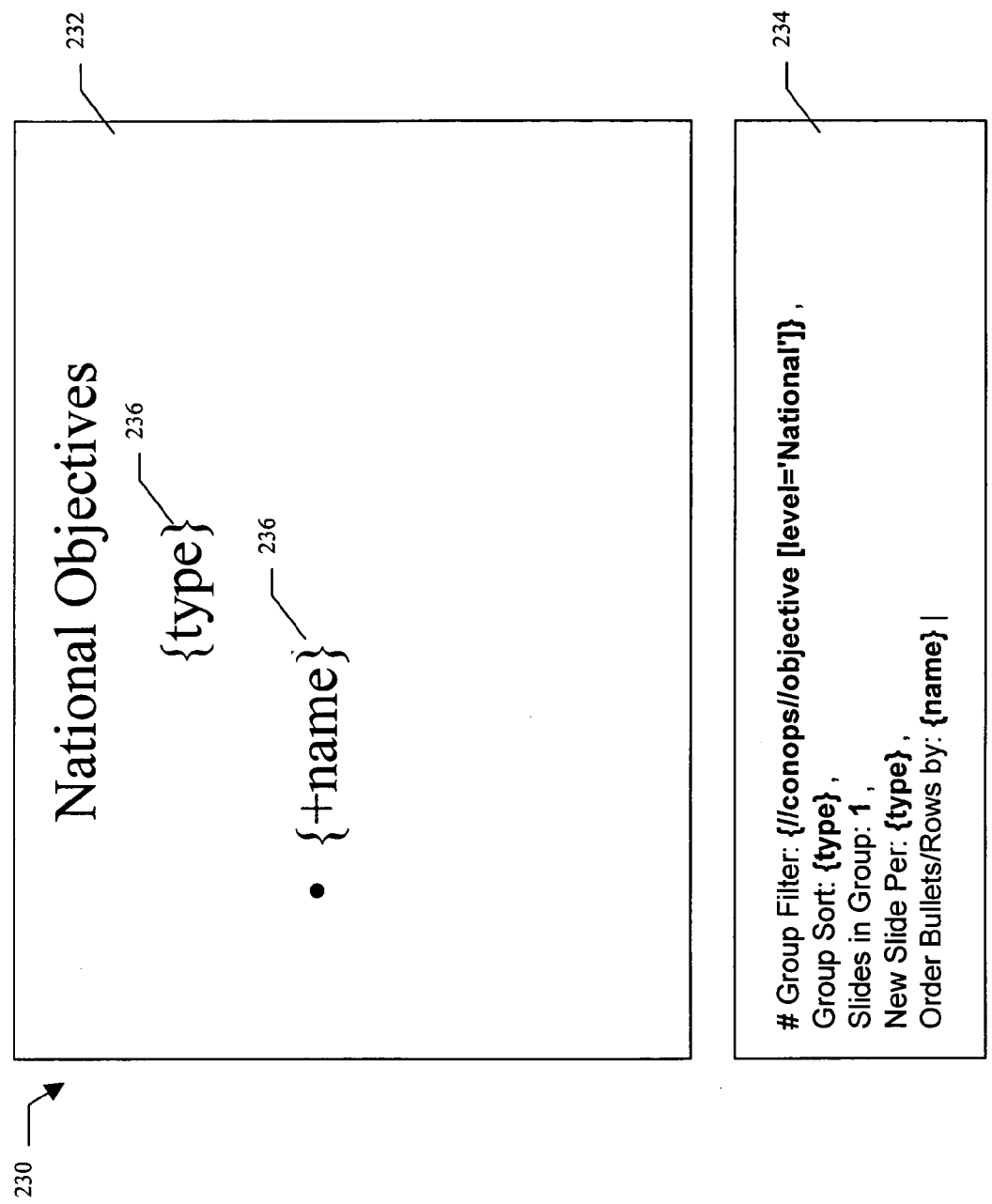
FIGS. 23A, 23B and 23C show three pages in a template that can be processed by one embodiment of the invention.
Figure 23B:
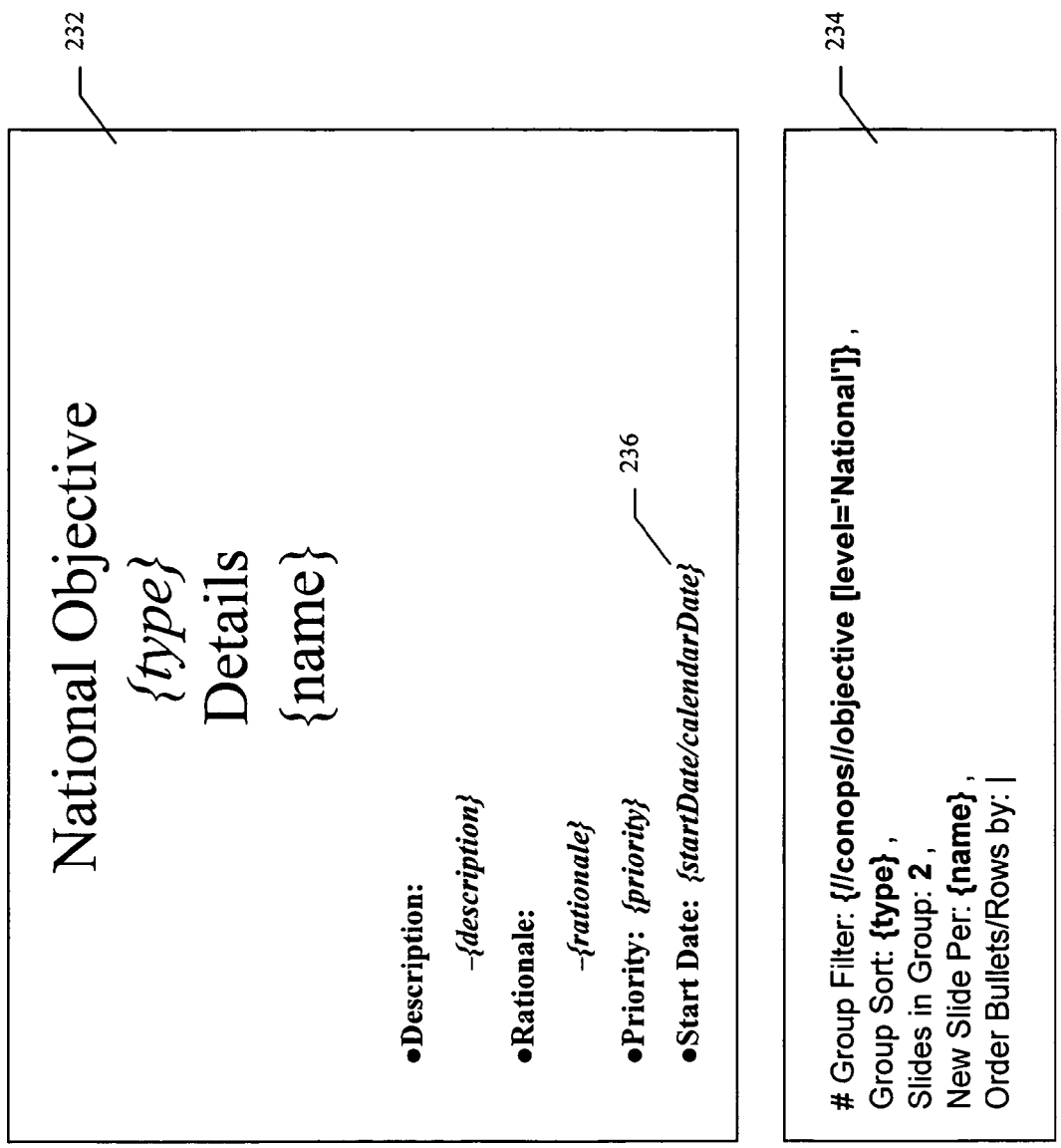
Figure 23C:
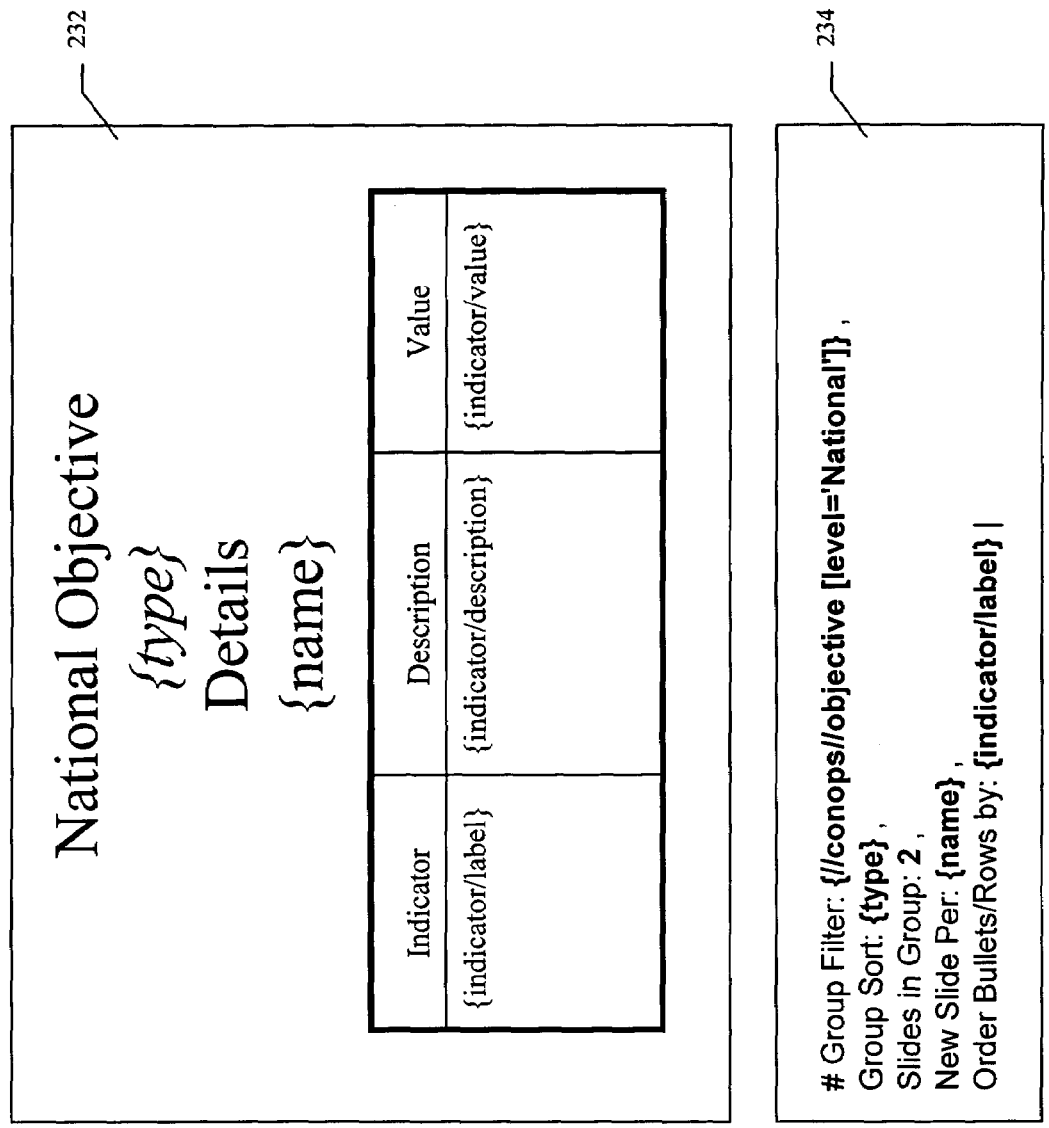
Figure 24:
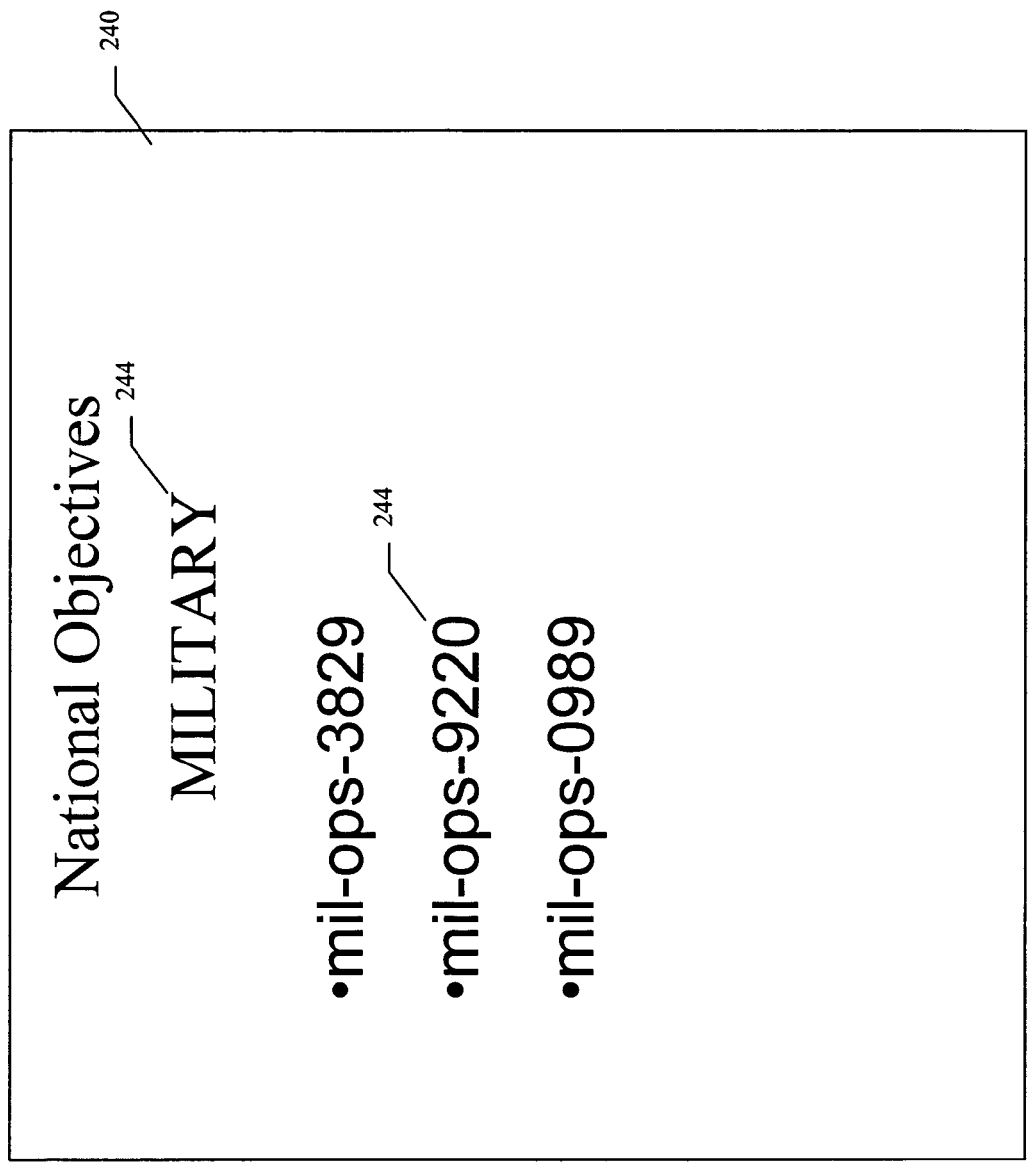

To explain how the data listed in FIGS. 21 and 22 or table 1 can be accessed by processing instructions in the template to generate a presentation in PowerPoint, FIGS. 23A, 23B and 23C show three pages that are part of a multi-slide template 230. FIG. 24 illustrates how PowerPoint may displays the first slide page of the template 230. Text and other display objects may be inserted by the end user in the slide pane area 232 of the template. The user may also insert processing instruction tags 236 corresponding to fields in the data source. Various means may be used to insert such tags. In FIG. 24, the user encloses plain text in braces { } to indicate a tag. Additional parameters may also be enclosed by the brackets. For example, the template page in FIG. 23A indicates that the TYPE data field should be inserted below the text "National Objectives" and then all of the NAME data fields should be listed as bullet points. The plus-sign in the example of FIG. 24 may indicate that all pertinent records should be included rather than just the current record.

In one embodiment, the user does not need to type the brackets and text in order to insert tags. Rather, in such an embodiment the GUI shown in FIGS. 17 to 19 may be used and the user may simply click on one of the field names, and then drag-and-drop a tag for that field into the proper location of the template.

FIG. 23A also shows the standard PowerPoint notes pane 234 below the slide pane 232. One embodiment of the invention leverages the notes pane 234 to store processing instructions. Other embodiments allow the user to set up the processing instructions in different ways, such as in a comments section, within the main portion of the template, etc.

In yet another embodiment, the processing instructions may be associated with one or more smart tags and placed in the resulting presentation file. In such a presentation file, the end user may use the smart tag to update one section, multiple sections, or the entire presentation by re-querying the data source. Of course in yet other embodiments the processing instructions may be embedded in the presentation file itself not with smart tags but with other features that one skilled in the art may choose to leverage.

The processing instructions in the notes pane 234 of the example in FIG. 23A include five lines. In this example, XPath query language is shown. In other embodiments, other protocols may be used. The first line ("# Group Filter . . . ") sets the context of the slide (or group of slides). For example, here only records for which the LEVEL field is set to 'National' are to be included in the presentation.

One skilled in the art will recognize that setting the context (i.e., determining what data to extract from the data source) may be implemented to offer various features. Three possible features are to sort by frequency, sort by structural elements, and to sort by a combinations of structural elements and relational links. In sorting by frequency, in one embodiment, data from the data source may be sorted according to some frequency requirement. The highest 10 results, the most common 5 results, the lowest 15 different results are three examples of how frequency may be used in building the presentation.

In sorting by structural elements, the structure of the data source may itself be a sorting/filtering requirement. For example, one may choose to only report in the presentation items where more than two child elements exist. Or, the presentation may dictate that a data element should only be shown when its child elements have data for priority filed. In yet a third example, a user may use an instruction that a data entity should be listed in addition to its child entities.

In sorting by a combination of structural elements and relational links, the status of structural elements (such as choosing those with two or more child links) may be used in combination with the more traditional relational requirements (i.e., where the foreign key in one table is the primary key in a second table).

Some embodiments of the invention may also provide an analysis feature whereby the structure and data source may be proactively analyzed to determine commonly and likely queries that a user may find helpful. As data sources may be complex in structure, pre-built queries may allow the use of the invention to be much more user friendly.

Returning now to FIG. 23A, the second line ("Group sort . . . ") includes information on how the context is to be sorted. Here, the data (and hence the presentation) will be sorted by the TYPE data field. The third line in the instructions ("Slides in Group . . . ") informs the generator how many slide templates exist for the current grouping of slides. In FIG. 23A, the processing instructions indicate that there is only the one slide making up its own group.

The fourth instruction line ("New Slide Per . . . ") is the break-on condition, stating when to break to a new slide group. FIG. 23A's slide template will break once the TYPE data field changes. The fifth and final instruction ("Order Bullets . . . ") sets up the ordering format for any bullets or numbered list displaying on the template.

Comparing the data of FIGS. 21 and 22 against the first template shown in FIG. 23A, one skilled in the art will understand that the generator program will work on only data for which the LEVEL field is set to "National" (i.e., rows with ID of 1 to 7). From these seven records, the generator will sort by TYPE (hence the records would first process the Economic, then the Military, then the Political, and finally the Social fields). Assuming that the presentation generating is currently processing the Military records, the FIG. 23A template will cause the names of row IDs 1, 2 and 3 to be shown as the bullet points. FIG. 24 shows such a resulting slide from the template and the bulleted data 244.

FIGS. 23B and 23C illustrate how a user may set up a second group of slide templates for the presentation in PowerPoint. In these two figures, the processing instructions in the notes pane 234 indicate that there are two slides that make up the group. Thus, these two templates will cause two slides to be inserted in the presentation file for each processed record. FIGS. 25 and 26 illustrate the resulting portion of the presentation based on the template slides of FIGS. 23B and 23C for the "mil-ops-3829" project and FIGS. 27 and 28 correspond to the "mil-ops-9220" project.

If a template consists of the three slides shown in FIGS. 23A, 23B and 23C, and if only the "National" level data shown in FIGS. 21 and 22 are to be included, then the final presentation will consist of the following 18 slides, in this order:

TABLE 2

| slide # | template used | records included in slide | Type | Name |
| --- | --- | --- | --- | --- |
| 1 | 23A | ID = 6 | economic | econ-ops-3892 |
| 2 | | 23B ID = 6 | economic | econ-ops-3892 |
| 3 | | 23C ID = 6 | economic | econ-ops-3892 |
| 4 | 23A | ID = 3, 1 and 2 | military | mil-ops-0989, mil-ops-3829 & mil-ops-9220 |
| 5 | | 23B ID = 3 | military | mil-ops-0989 |
| 6 | | 23C ID = 3, 110 and 111 | military | mil-ops-0989 |
| 7 | | 23B ID = 1 | military | mil-ops-3829 |
| 8 | | 23C ID = 1, 101, 102, 103, 104 and 105 | military | mil-ops-3829 |
| 9 | | 23B ID = 2 | military | mil-ops-9220 |
| 10 | | 23C ID = 2, 106 and 107 | military | mil-ops-9220 |
| 11 | 23A | ID = 5 & 4 | political | pol-ops-7739 & pol-ops-8328 |
| 12 | | 23B ID = 5 | political | pol-ops-7739 |
| 13 | | 23C ID = 5 | political | pol-ops-7739 |
| 14 | | 23B ID = 4 | political | pol-ops-8328 |
| 15 | | 23C ID = 4 | political | pol-ops-8328 |
| 16 | 23A | ID = 7 | social | soc-ops-0558 |
| 17 | | 23B ID = 7 | social | soc-ops-0558 |
| 18 | | 23C ID = 7 | social | soc-ops-0558 |

Notice in table 2 how for each set of data processed from the data source, there is a slide based on the FIG. 23A template followed by two slides from the grouped templates of FIGS. 23B and 23C.

To better understand the coding shown in the figures, a short explanation of XPath functionality will now be provided. First, the "/" item may be used to represent an absolute path to a data element. The "[ ]" item may be used to further specify an element. The "//" item may be used to select all elements in the document that satisfy the criteria queried. The " . . . /" item may be used to select the parent of the current node. The "ancestor::" item may be used to select all of the ancestors (such as the parent and the grandparent) of the current node. The "preceding::" item may be used to select everything in the document before the starting tag of the current node.

In addition to the standard XPath features shown in FIGS. 23A, 23B and 23C, in one embodiment, additional specialized support to provided for parsing the following processing instruction elements: ?, @, and +. In one embodiment, the "?" item may act as a placeholder for 'unique objects' that are queried within an XML document. Each new object id may then represent a new set of slides to follow for that object. The "@" item may act like a 'carriage return' for information to be repeated (at the parent level) within a presentation (such as a PowerPoint slide or a Word document). The "+" item may act like a 'carriage return' for information to be repeated at the child level if it is used in conjunction with the "@" item.

The use of these processing elements may be shown in operation by the template shown in FIG. 29 and explained in table 3 below:

TABLE 3

| Query # | Code Parsed | Explain Code in English |
| --- | --- | --- |
| 1 | # Group Filter: {//branch | begin queries for all branches . . . |

TABLE 3-continued

| Query # | Code Parsed | Explain Code in English |
|---|---|---|
|  | /phase<br>[not (<br>(uniqueObjectId =<br>preceding::phase/<br>uniqueObjectId)]}, | display those phases . . .<br>except those that . . .<br>have a unique Object ID<br>that has been found before.<br><br>(In other words, for query 1, find all of<br>the Phases within a Branch, but don't<br>duplicate any.) |
| 2 | Group Sort:<br>{ . . . /unique-<br>ObjectId},<br>Slides in Group: 1, | sort the slide group<br>by Branches having a unique Object IqD<br><br>the group contains a single slide |
| 3 | New Slide Per:<br>{./uniqueObjectId}, | Create a new slide . . .<br>for each Phase that has a unique Object ID |
| 4 | Order Bullets/<br>Rows by:<br>{ . . . /priority}, | Order the rows in the slide . . .<br><br>by the Priority field |
| 5 | Row Per:<br>{//branch<br>/phase<br>[./uniqueObjectId =<br>'?']<br>//objective<br>[not<br>(uniqueObjectId =<br>preceeding::phase//<br>objective/<br>uniqueObjectId)]<br>/label<br>[ . . . /level =<br>'Tactical']}<br>| | Each row is . . .<br>for all Branches . . .<br>display all Phases . . .<br>and create a placeholder that is for each<br>Phase that has a unique Object ID . . .<br>and display those Objectives . . .<br>except for those that . . .<br>have a unique Object ID . . .<br>that have been found before in a<br>preceding Phase . . .<br><br>and display the name . . .<br>of those Objectives which have a level of<br>'Tactical'<br>end Queries |

Figure 29:
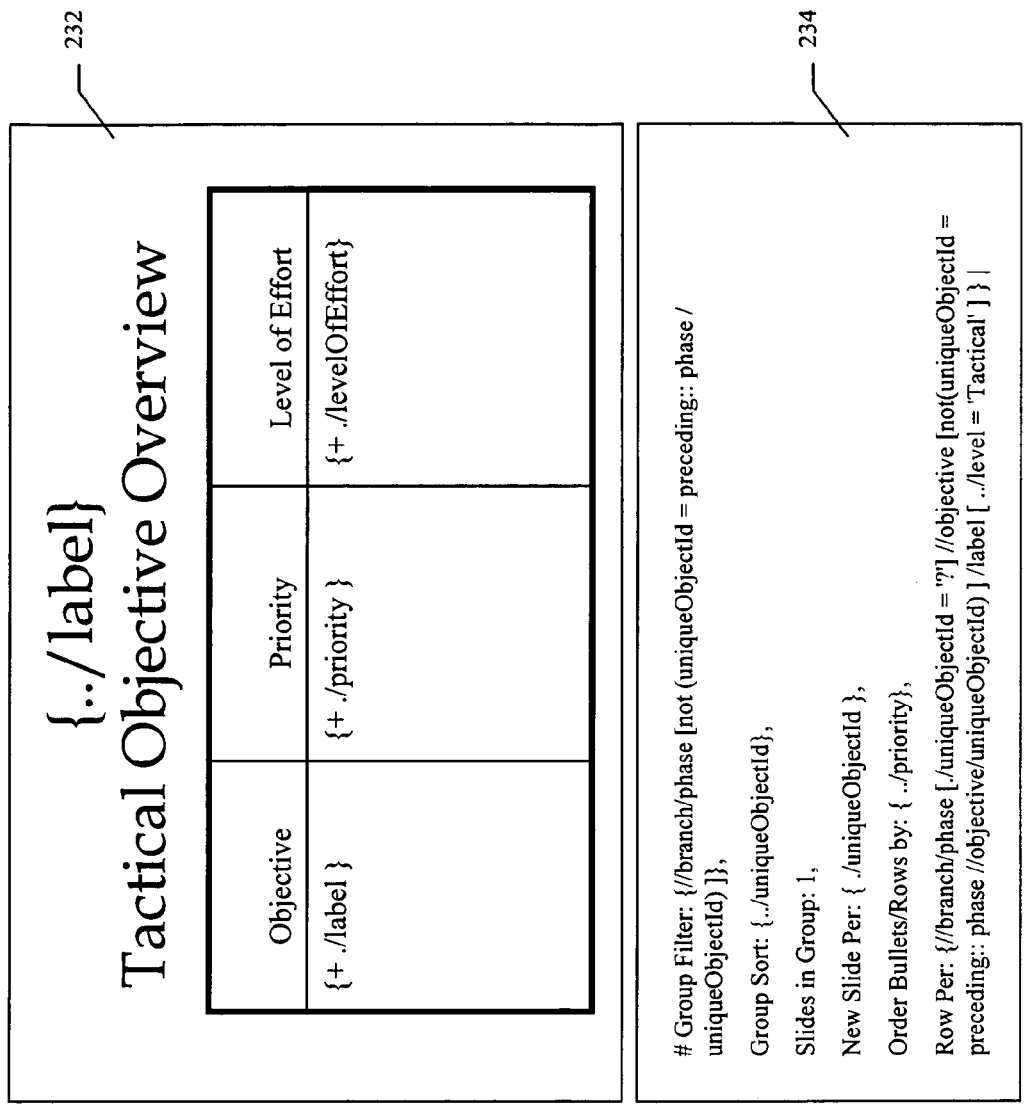
FIG. 29 shows one page from a presentation template that may be processed by the present invention.
Figure 30:
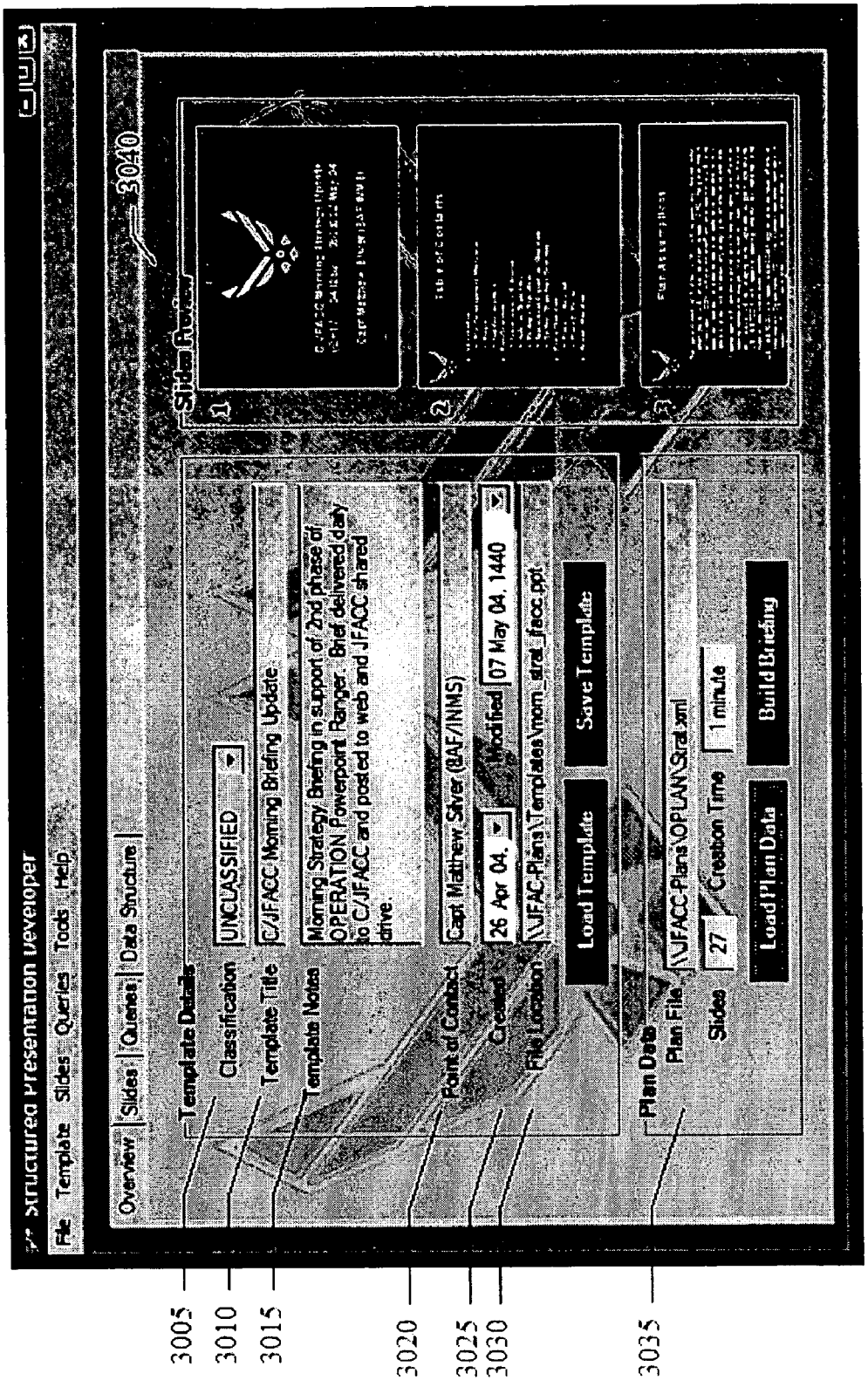

The five queries for the template of FIG. 29 begin with the first query being executed against the data source. As shown in the "Explain Query in English" column of table 3, the data for all of the Phases in a Branch are retrieved (without duplicates), stored and the cursor is located at the "Phase" level within the XML source file.

Queries 2 and 3 begin where this cursor was placed at the termination of query 1 (i.e., at the Phase level). Query #2 reads its query, and looks for its information one level up (i.e., at the "Branch" level, which is one level higher than where Query #1 concluded) and stores the appropriate data (i.e., sorting the slide group by Branch). Query #3 reads its query to, looks for its information at the "Phase" level (i.e. the same level where Query #1 concluded) and stores the appropriate data.

Query #5 is then read and stored with the cursor resting at the overall "level" for Objectives within the XML file. Lastly, query #4 reads its query and searches for its information at the "Objective" level within the XML file (one step up from where Query #5 concluded which was at the overall "level" for Objectives).

FIGS. 30 through 36 illustrate a more robust embodiment of the present invention than that shown in FIGS. 17 through 19 and discussed above. As shown starting in FIG. 17, this embodiment of the invention has a four-tabbed user interface. The overview tab allows the user to store information about the presentation, such as its classification 3005, its title 3010, notes about it 3015, a point of contact 3020, dates of creation and modification 3025, and location of the template file 3030 and data sources 3035. Such an embodiment may include a preview region 3040 where a user may see a thumbnail of some of the slides in the template. This feature may help the user to quickly find the correct template.

Figure 31:
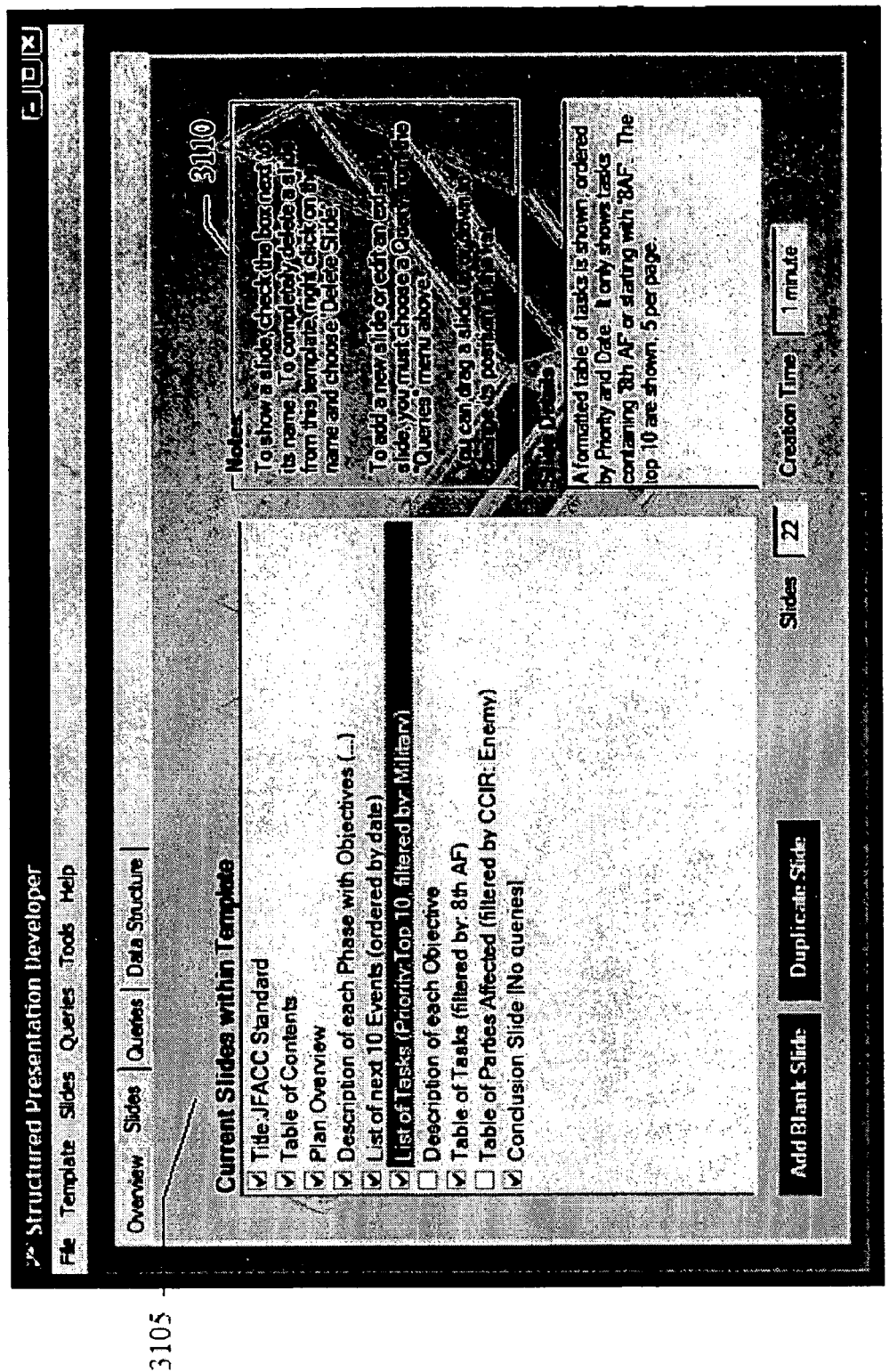

FIG. 31 shows the slides tab where a list of queries saved within the template are listed 3105 for the user to activate or deactivate. Details about the template may also be stored here 3110.

Figure 32:
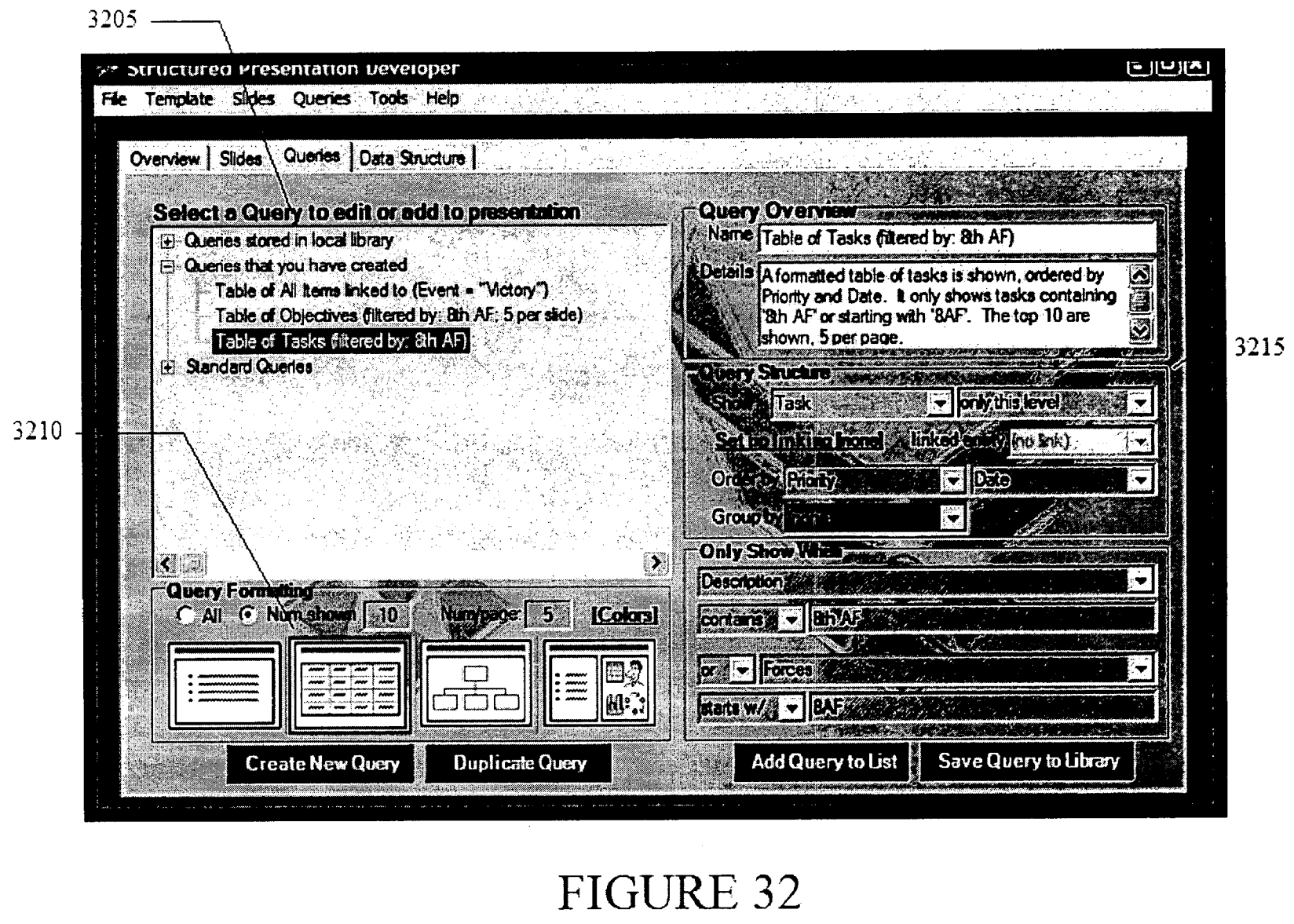
Figure 33:
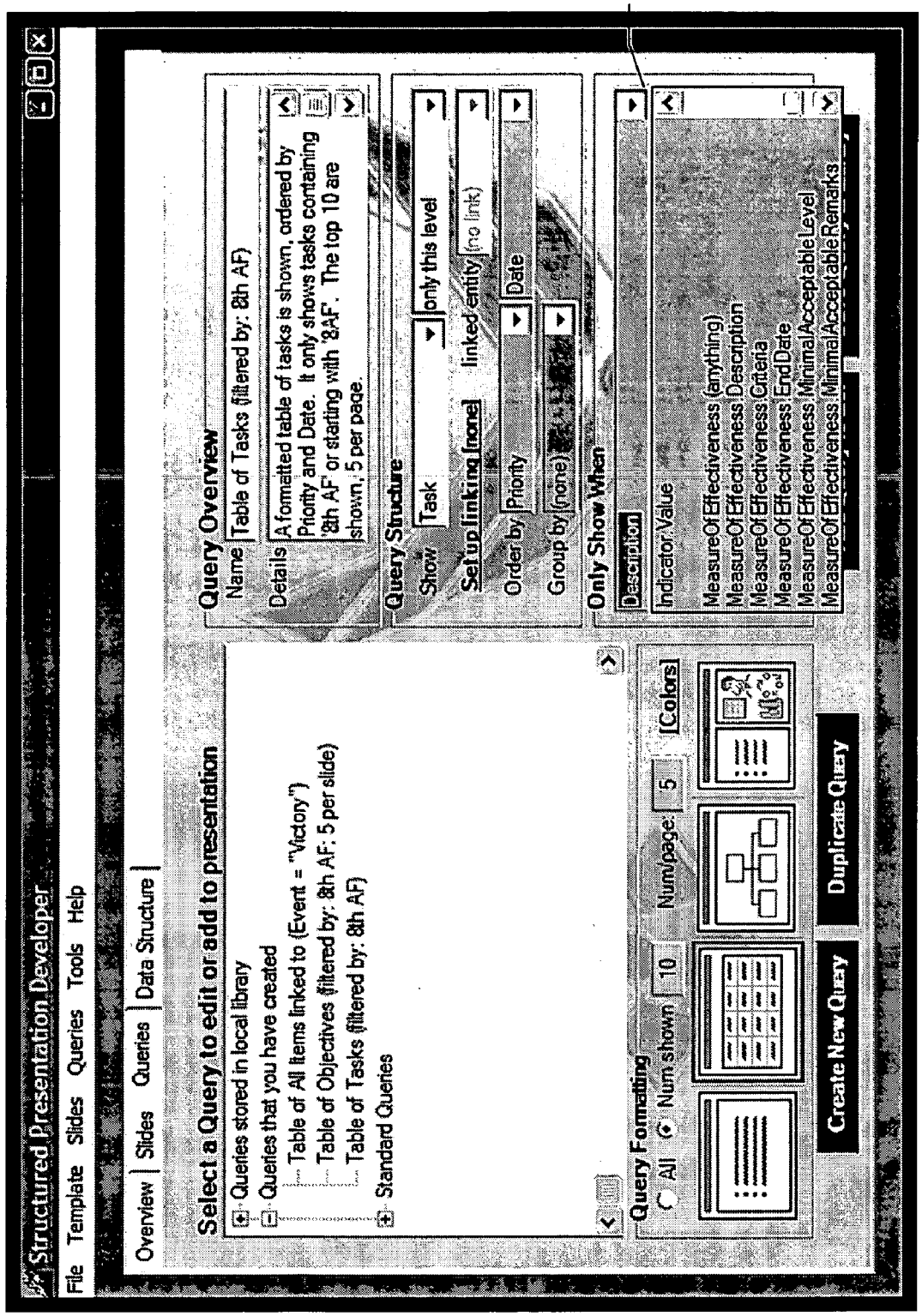
Figure 34:
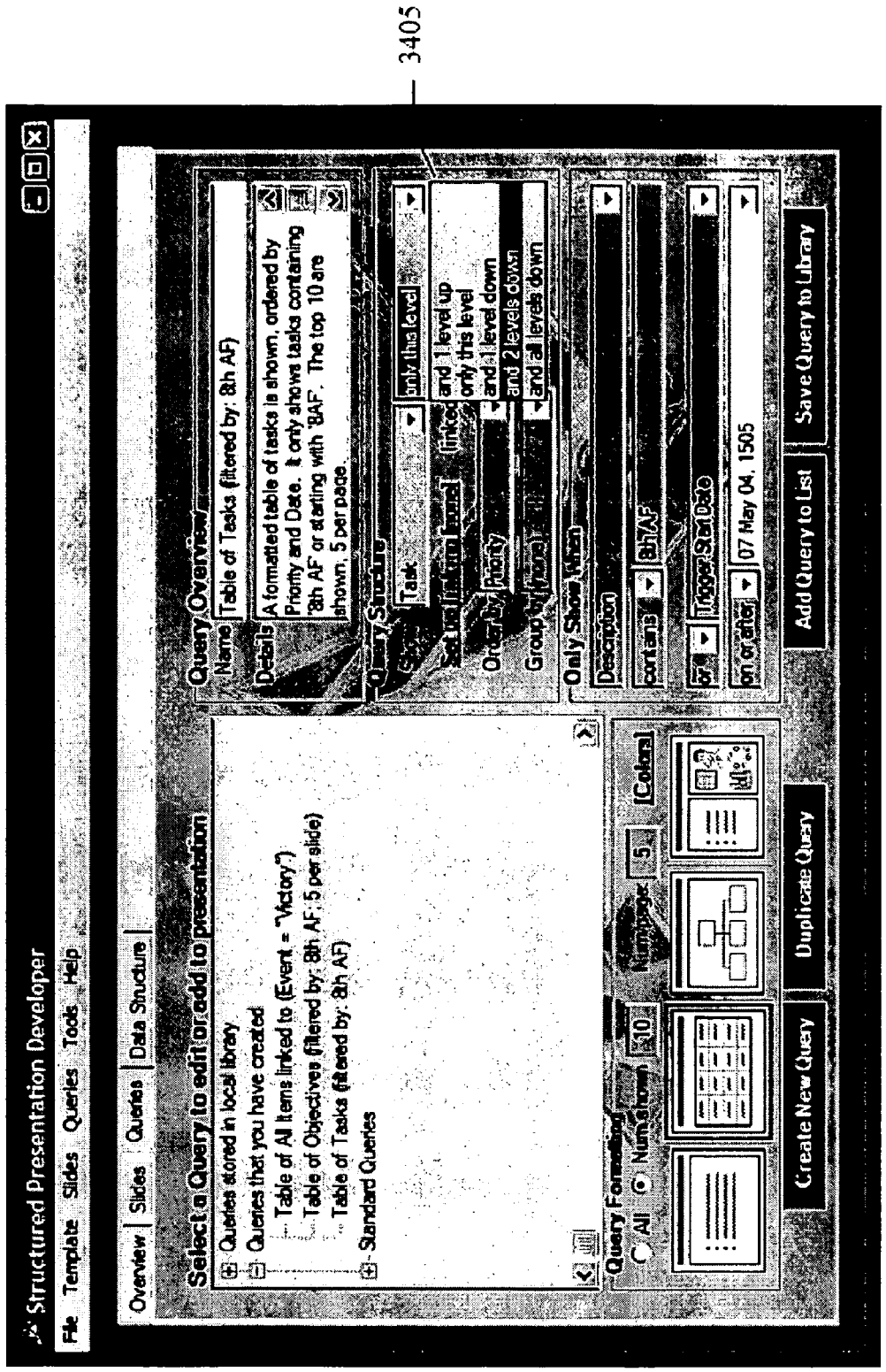

FIG. 32 is the queries tab where queries may be added, or saved queries may be used (with or without modification) 3205. The query's format 3210 and details about its structure 3215 may be modified through this tab. FIG. 33 shows how a dropdown menu may assist the user in choosing filtering for the query 3305. FIG. 34 shows how a dropdown menu may assist the user in choosing the level, which determines what (if any) data from children should be included with the query 3405.

Figure 35:
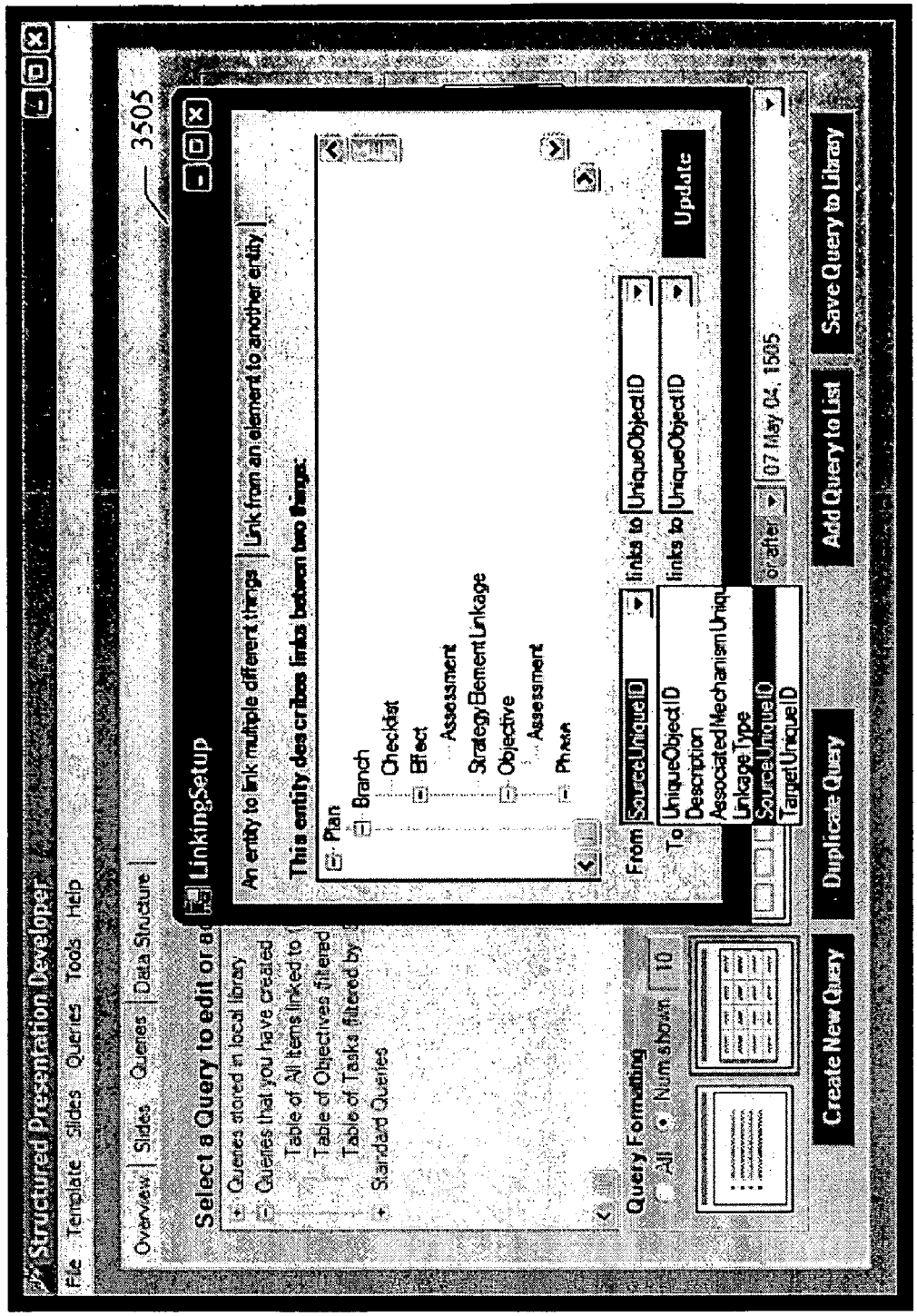
Figure 36:
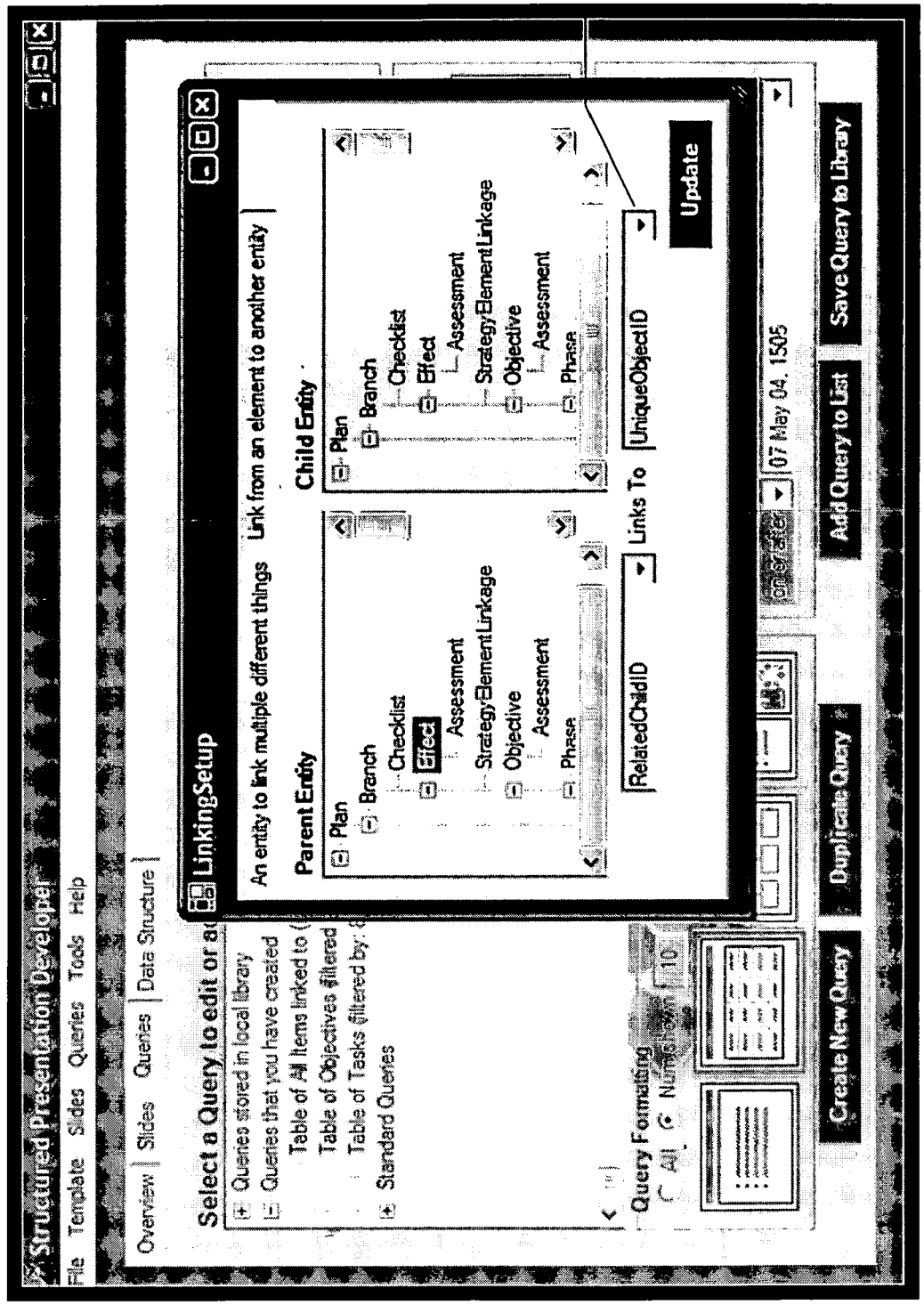

FIG. 35 shows a linking setup window 3505, which may be used to identify relational linking entities of one entity that then link two other entities. This feature may allow relationships that do not follow a tree hierarchy. This linking setup window is further shown in FIG. 36, where one entity is linked to another entity 3605.

The foregoing description addresses embodiments encompassing the principles of the present invention. The embodiments may be changed, modified and/or implemented using various types of arrangements. Those skilled in the art will readily recognize various modifications and changes that may be made to the invention without strictly following the exemplary embodiments and applications illustrated and described herein, and without departing from the scope of the invention. For example, one embodiment of the invention provides functionality to enable the user to refresh individual pieces of data. Another embodiment enables the user to specify on the template that a hyperlink should be generated linked to another slide in the presentation. In yet another embodiment, the presentation generator's GUI allows the user the see the representative data on the template rather than the symbolic field tags.

The invention claimed is:

1. A method for generating a presentation file, comprising:
   providing a desktop application for generating a presentation file in a first file format related to a document of the desktop application, wherein the first file format is one of a .pot format and a .dot format;
   accessing a data source comprising a plurality of data records structured into a plurality of data fields, wherein the data source is in a second file format, wherein the second file format is an .xml format;
   providing an end user of a computer with a listing of a plurality of tags, wherein a tag is associated to one of the data fields in the data source;
   choosing a template file related to the first file format of the desktop application, where the template file comprises;
      at least one of the plurality of tags; and
      at least one processing instruction for Indicating how the data source is processed to build the document; and
   processing the template file with the data source based on the at least one of the plurality of tags and the at least one processing instruction, for building the presentation file into the document of the desktop application in the first file format for reporting information from the data source;
   wherein at least one of the processing instructions is a query embedded in the template file, for allowing the end user to associate the data source to the template.

2. The method from claim 1, wherein at least one of the processing instructions is a second query embedded in the template file.

3. The method from claim 2, wherein the first query is for a first data source and the second query is for a second data source.

4. The method from claim 1, wherein the at least one processing instruction queries the data source for presenting more than one data record on a single page in the presentation file.

5. The method from claim 1, wherein the step of processing the template file with the data source based on the at least one processing instruction comprises:
   grouping a first template page and a second template page from the template file;
   determining a break-on condition for one of the plurality of data fields, where the break-on condition is satisfied when data associated with the data field changes;
   creating pages in the presentation file based on the first and second template pages; and
   repeating the step of creating pages based on the first and second template pages when the break-on condition is met.

6. The method from claim 5, wherein the step of processing the template file with the data source based on the at least one processing instruction further comprises querying the data source for presenting more than one data record on a single page in the presentation file.

7. The method from claim 1, wherein the at least one processing instruction is stored in a notes region of the template file.

8. The method from claim 1, wherein the at least one processing instruction is stored in a comments region of the template file.

9. A method for generating a presentation, comprising:
   providing a desktop application for generating a presentation file in a first file format related to a document of the desktop application, wherein the first file format is one of a .pot format and a .dot format;
   accessing a data source comprising a plurality of data records structured into a plurality of data fields, wherein the data source is in a second file format, wherein the second file format is an .xml format;
   accessing a template file related to the first file format of the desktop application, the template file comprising at least one tag and at least one processing instruction, wherein the tag is associated to one of the data fields in the data source;
   processing the template file and the data source based on the at least one tag and the at least one processing instruction, for building the presentation file into the document of the desktop application in the first file format for reporting information from the data source;
   wherein at least one of the processing instructions Is a query embedded in the template file, for allowing the end user to associate the data source to the template.

10. The method from claim 9, wherein the query is embedded in the template file as a smart tag for allowing an end user to re-query the data source from the presentation file to update the presentation file.

* * * * *